US008165873B2

(12) United States Patent
Yamada

(10) Patent No.: US 8,165,873 B2
(45) Date of Patent: Apr. 24, 2012

(54) SPEECH ANALYSIS APPARATUS, SPEECH ANALYSIS METHOD AND COMPUTER PROGRAM

(75) Inventor: Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 12/176,739

(22) Filed: Jul. 21, 2008

(65) Prior Publication Data

US 2009/0030690 A1 Jan. 29, 2009

(30) Foreign Application Priority Data

Jul. 25, 2007 (JP) ................ P2007-193931

(51) Int. Cl.
*G10L 11/04* (2006.01)
(52) U.S. Cl. ........ 704/207; 704/201; 704/216; 704/217; 704/218
(58) Field of Classification Search .................. 704/207, 704/216–218, 260, 201, 2, 4
See application file for complete search history.

(56) References Cited

U.S. PATENT DOCUMENTS

| | | | | | |
|---|---|---|---|---|---|
| 3,603,738 | A | * | 9/1971 | Focht ............................ | 704/207 |
| 3,978,287 | A | * | 8/1976 | Fletcher et al. ............... | 704/231 |
| 4,477,925 | A | * | 10/1984 | Avery et al. .................... | 704/237 |
| 4,653,098 | A | * | 3/1987 | Nakata et al. .................. | 704/207 |
| 4,720,865 | A | * | 1/1988 | Taguchi ......................... | 704/216 |
| 4,809,334 | A | * | 2/1989 | Bhaskar ........................ | 704/207 |
| 4,860,360 | A | * | 8/1989 | Boggs ........................... | 704/233 |
| 4,937,868 | A | * | 6/1990 | Taguchi ........................ | 704/220 |
| 4,959,865 | A | * | 9/1990 | Stettiner et al. ............... | 704/233 |
| 5,699,477 | A | * | 12/1997 | McCree ......................... | 704/216 |
| 5,704,000 | A | * | 12/1997 | Swaminathan et al. ....... | 704/207 |
| 5,745,871 | A | * | 4/1998 | Chen ............................. | 704/207 |
| 5,787,387 | A | * | 7/1998 | Aguilar ......................... | 704/208 |
| 5,799,276 | A | * | 8/1998 | Komissarchik et al. ....... | 704/251 |

(Continued)

FOREIGN PATENT DOCUMENTS

JP 64-032300 2/1989

(Continued)

OTHER PUBLICATIONS

A. de Cheveigne, H. Kawahara, "Yin, a Fundamental Frequency Estimator for Speech and Music", JASA, 2002, pp. 1917-1930.*

*Primary Examiner* — Talivaldis Ivars Smits
*Assistant Examiner* — Fariba Sirjani
(74) *Attorney, Agent, or Firm* — Finnegan, Henderson, Farabow, Garrett & Dunner, L.L.P.

(57) ABSTRACT

A speech analysis apparatus analyzing prosodic characteristics of speech information and outputting a prosodic discrimination result includes an input unit inputting speech information, an acoustic analysis unit calculating relative pitch variation and a discrimination unit performing speech discrimination processing, in which the acoustic analysis unit calculates a current template relative pitch difference, determining whether a difference absolute value between the current template relative pitch difference and a previous template relative pitch difference is equal to or less than a predetermined threshold or not, when the value is not less than the threshold, calculating an adjacent relative pitch difference, and when the adjacent relative pitch difference is equal to or less than a previously set margin value, executing correction processing of adding or subtracting an octave of the current template relative pitch difference to calculate the relative pitch variation by applying the relative pitch difference as the relative pitch difference of the current analysis frame.

11 Claims, 19 Drawing Sheets

U.S. PATENT DOCUMENTS

| | | | |
|---|---|---|---|
| 5,864,795 A * | 1/1999 | Bartkowiak | 704/207 |
| 5,963,895 A * | 10/1999 | Taori et al. | 704/207 |
| 5,970,441 A * | 10/1999 | Mekuria | 704/207 |
| 6,035,271 A * | 3/2000 | Chen | 704/207 |
| 6,199,036 B1 * | 3/2001 | Ahmadi | 704/207 |
| 6,219,635 B1 * | 4/2001 | Coulter et al. | 704/207 |
| 6,226,604 B1 * | 5/2001 | Ehara et al. | 704/207 |
| 6,516,298 B1 * | 2/2003 | Kamai et al. | 704/260 |
| 6,865,529 B2 * | 3/2005 | Brandel et al. | 704/207 |
| 7,272,551 B2 * | 9/2007 | Sorin | 704/205 |
| 7,284,004 B2 * | 10/2007 | Cooper et al. | 1/1 |
| 7,286,980 B2 * | 10/2007 | Wang et al. | 704/205 |
| 7,457,744 B2 * | 11/2008 | Lee et al. | 704/207 |
| 8,050,910 B2 * | 11/2011 | Joublin et al. | 704/207 |
| 2001/0029447 A1 * | 10/2001 | Brandel et al. | 704/207 |
| 2001/0044727 A1 * | 11/2001 | Nakatoh et al. | 704/500 |
| 2002/0010576 A1 * | 1/2002 | Brandel et al. | 704/207 |
| 2003/0163304 A1 * | 8/2003 | Mekuria et al. | 704/207 |
| 2003/0187651 A1 * | 10/2003 | Imatake | 704/269 |
| 2004/0158462 A1 * | 8/2004 | Rutledge et al. | 704/207 |
| 2004/0225493 A1 * | 11/2004 | Jung et al. | 704/207 |
| 2005/0086052 A1 * | 4/2005 | Shih | 704/207 |
| 2005/0091044 A1 * | 4/2005 | Ramo et al. | 704/207 |
| 2005/0096899 A1 * | 5/2005 | Padhi et al. | 704/216 |
| 2006/0009968 A1 * | 1/2006 | Joublin et al. | 704/205 |
| 2006/0074639 A1 * | 4/2006 | Goudar et al. | 704/207 |
| 2006/0195500 A1 * | 8/2006 | Joublin et al. | 708/309 |
| 2008/0120094 A1 * | 5/2008 | Mate et al. | 704/201 |
| 2008/0282872 A1 * | 11/2008 | Ma et al. | 84/627 |
| 2008/0288246 A1 * | 11/2008 | Su et al. | 704/207 |
| 2010/0241424 A1 * | 9/2010 | Gao | 704/207 |
| 2011/0125493 A1 * | 5/2011 | Hirose et al. | 704/207 |

FOREIGN PATENT DOCUMENTS

| | | |
|---|---|---|
| JP | 04-66999 | 3/1992 |
| JP | 04-066999 | 3/1992 |
| JP | 04-288600 | 10/1992 |
| JP | 07-261778 | 10/1995 |
| JP | 10-133693 | 5/1998 |
| JP | 2006-084664 | 3/2006 |
| JP | 2006-161370 | 12/2007 |
| JP | 2006-325780 | 6/2008 |

* cited by examiner

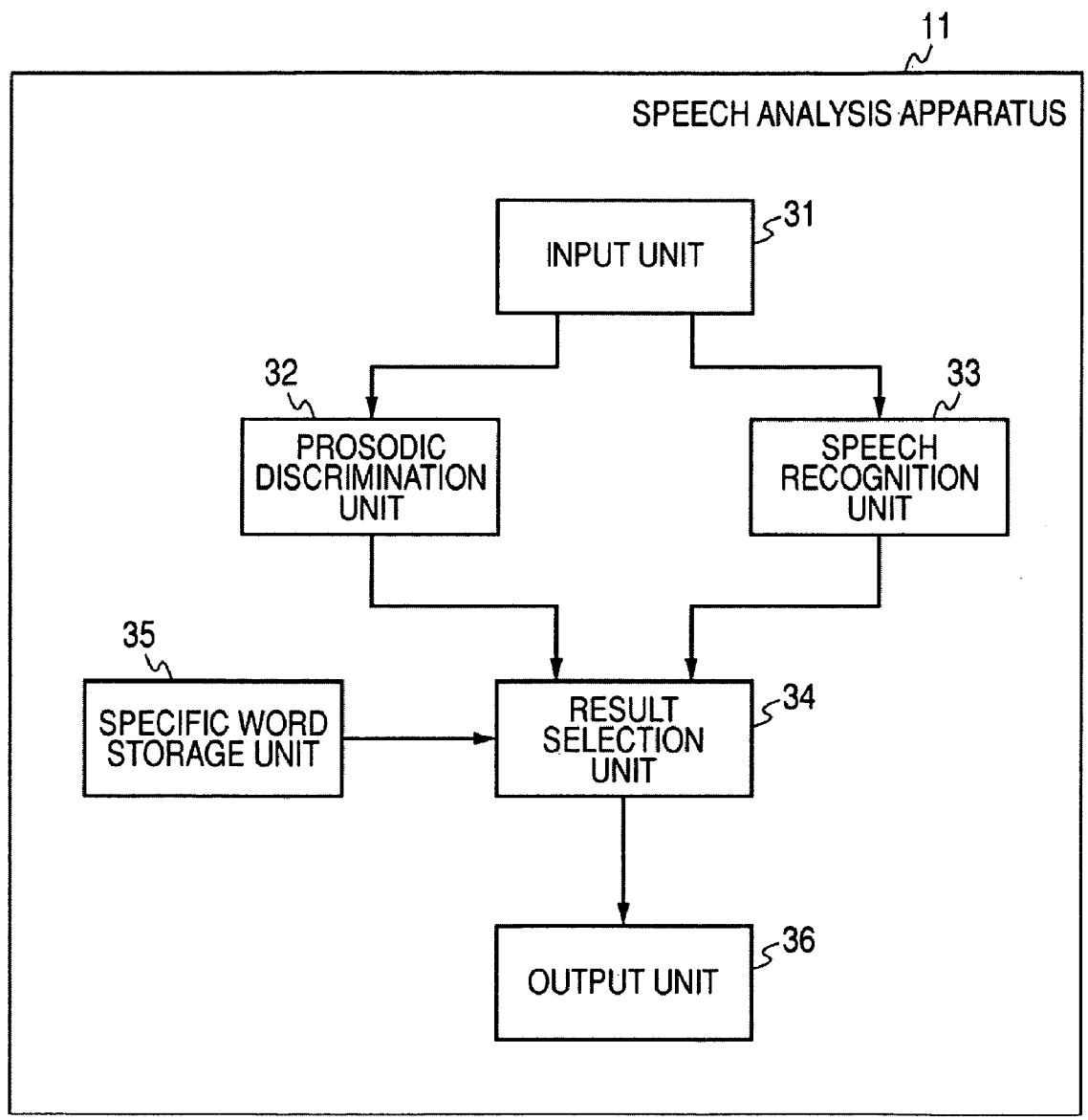

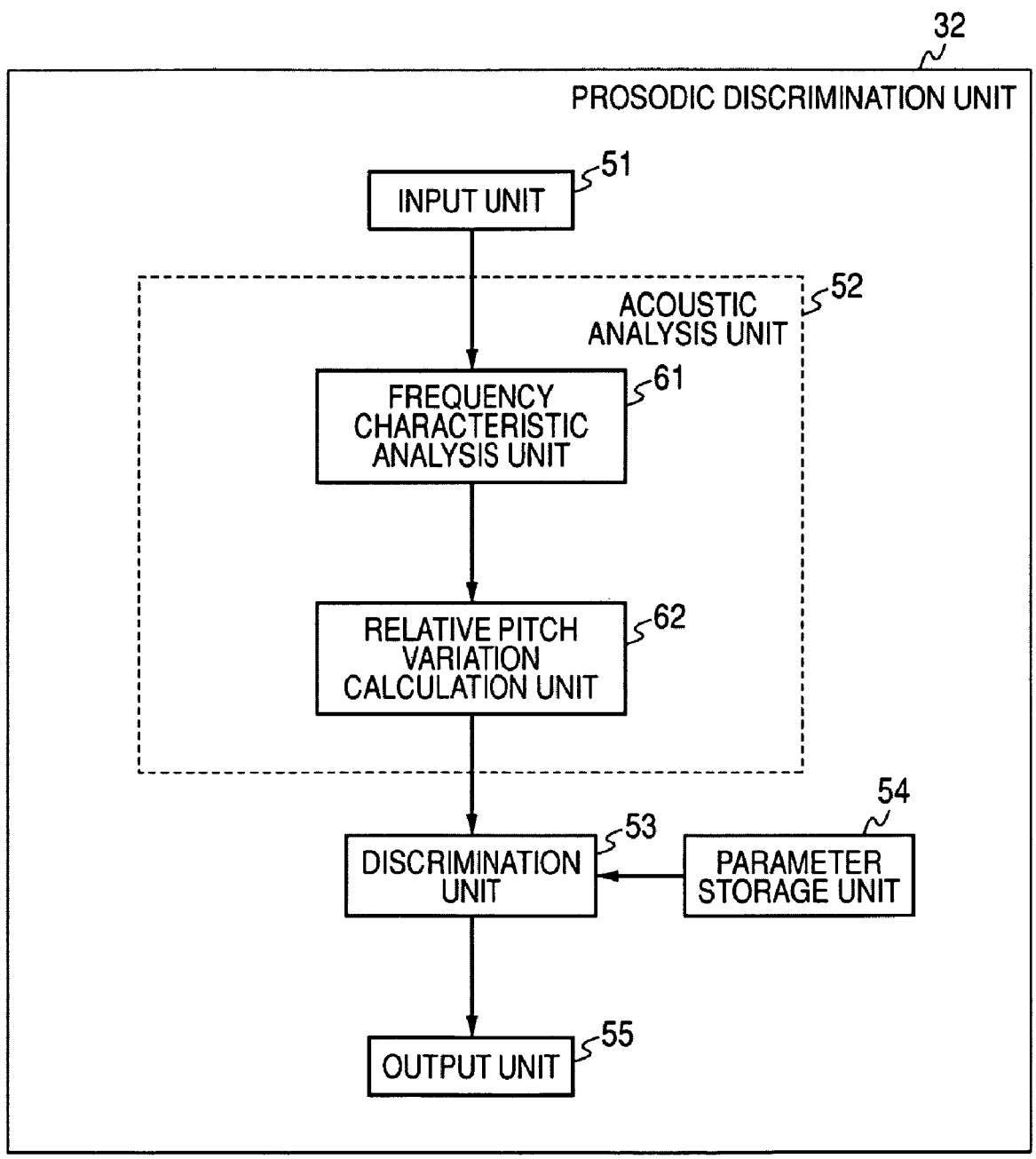

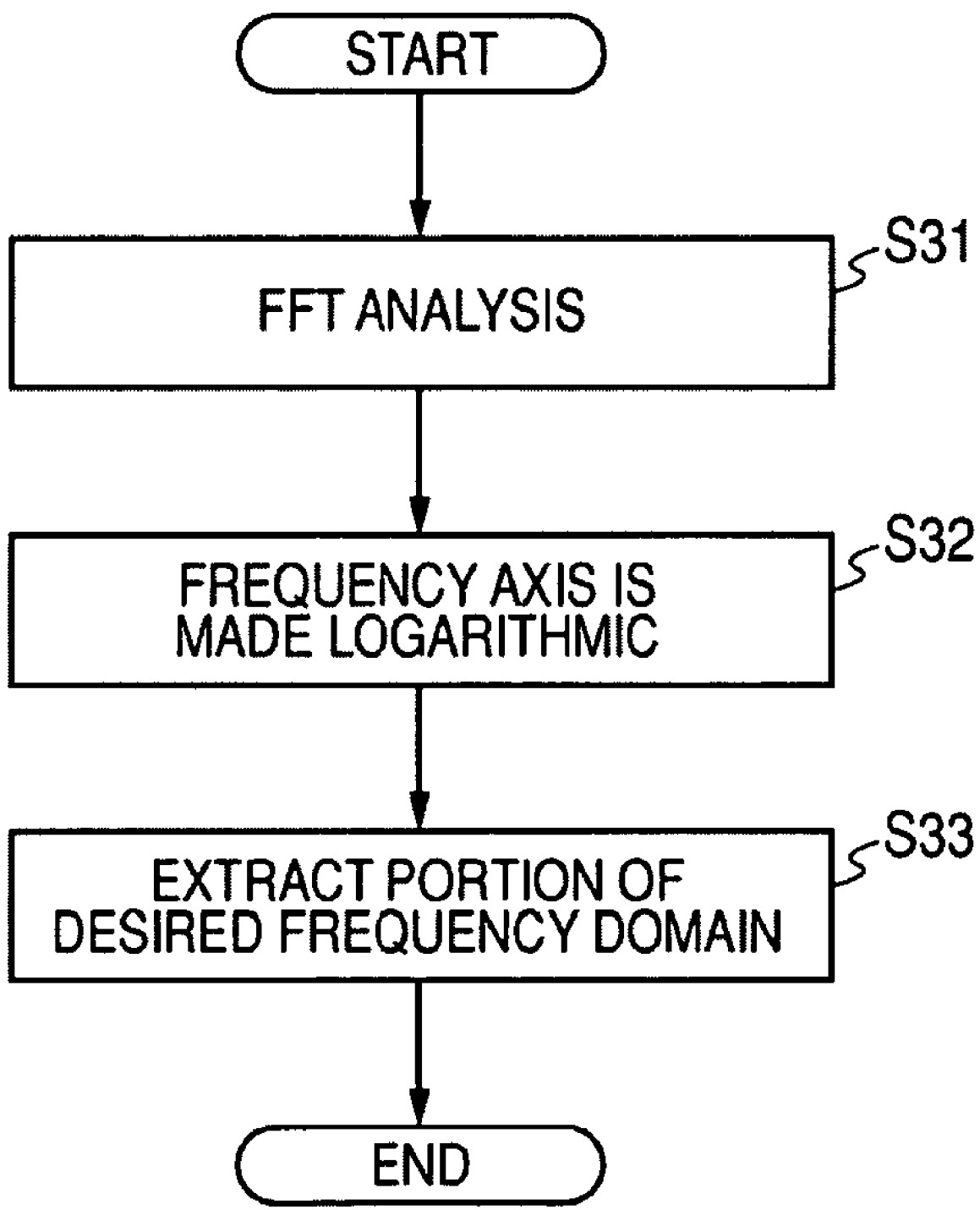

FREQUENCY CHARACTERISTIC AFTER FFT ANALYSIS

FREQUENCY CHARACTERISTIC ON LOGARITHMIC FREQUENCY AXIS

FREQUENCY CHARACTERISTIC IN WHICH ONLY DESIRED PORTION OF FREQUENCY DOMAIN IS EXTRACTED (LOGARITHMIC FREQUENCY AXIS)

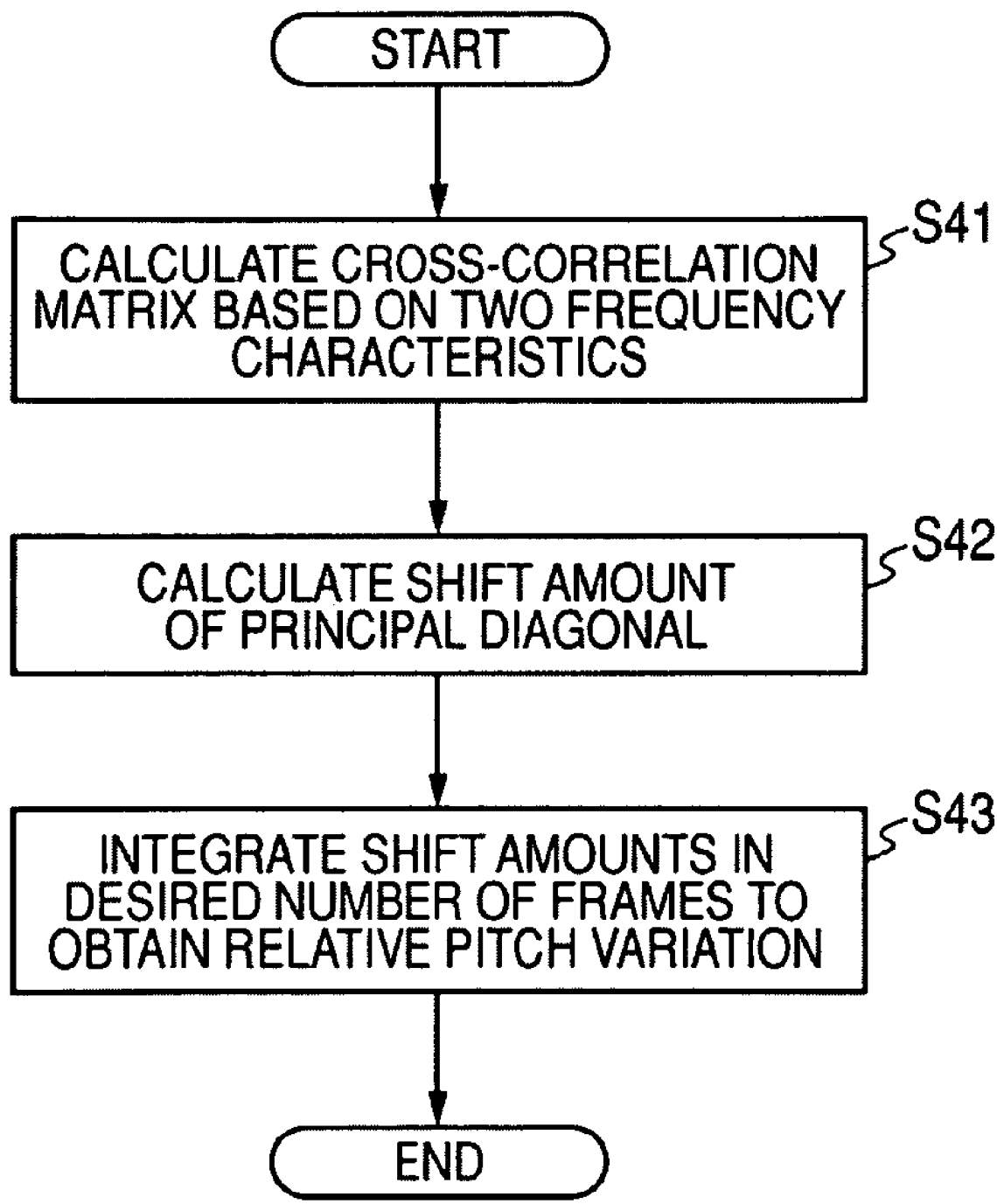

FREQUENCY CHARACTERISTICS
AND CROSS-CORRELATION MATRIX

FIG. 9 FREQUENCY CHARACTERISTICS AND AUTOCORRELATION MATRIX

AUTOCORRELATION MATRIX (GRAPHICAL DISPLAY)

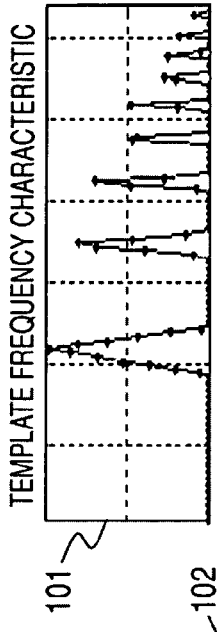
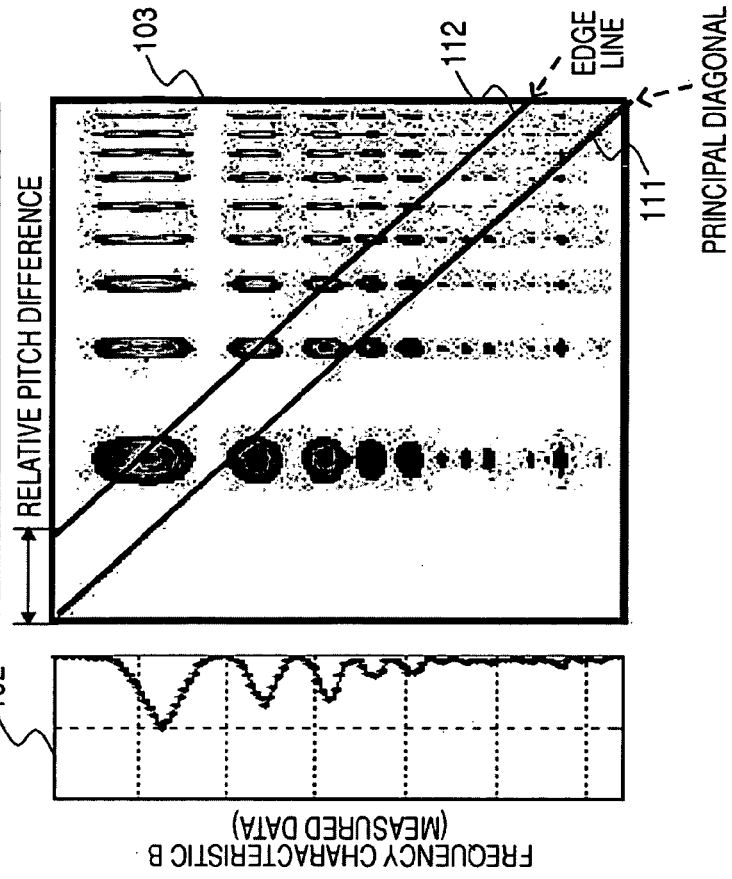
FIG. 11B
CROSS-CORRELATION MATRIX WITH RESPECT TO TEMPLATE FREQUENCY CHARACTERISTIC
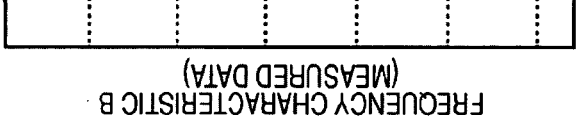
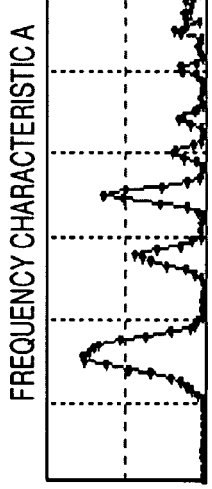
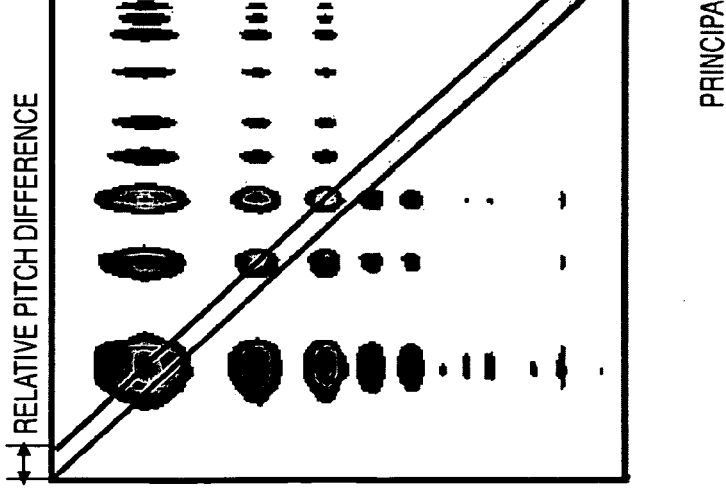
FIG. 11A
CROSS-CORRELATION MATRIX WITH RESPECT TO FREQUENCY CHARACTERISTICS WHICH ARE TEMPORALLY DIFFERENT (AS SAME AS FIG. 7, FIG. 8)
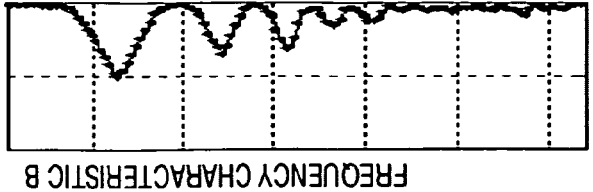

SPEECH WAVEFORM

PITCH PATTERN

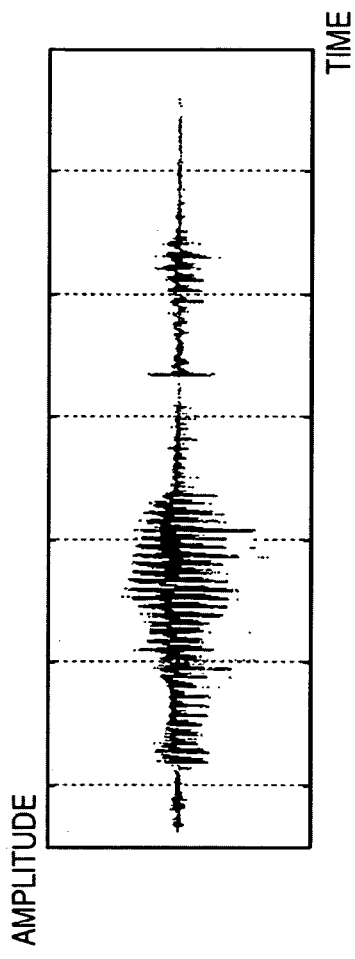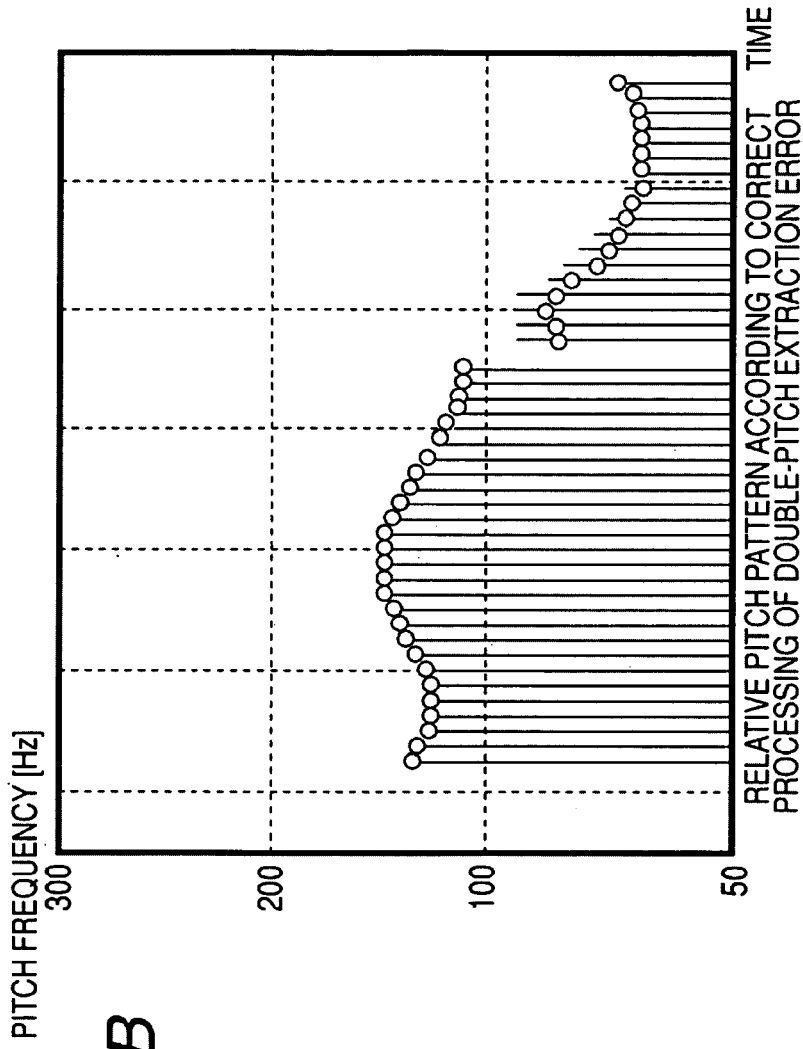
FIG. 18A SPEECH WAVEFORM
FIG. 18B PITCH PATTERN

SPEECH ANALYSIS APPARATUS, SPEECH ANALYSIS METHOD AND COMPUTER PROGRAM

CROSS REFERENCE TO RELATED APPLICATIONS

The present invention contains subject matter related to Japanese Patent Application JP 2007-193931 filed in the Japanese Patent Office on Jul. 25, 2007, the entire contents of which being incorporated herein by reference.

BACKGROUND OF THE INVENTION

1. Field of the Invention

The invention relates to a speech analysis apparatus, a speech analysis method and a computer program, and particularly relates to a speech analysis apparatus, a speech analysis method and a computer program suitable to be used when performing discrimination based on prosodic characteristics of input speech.

2. Description of the Related Art

In recent years, a speech recognition technology is widely used. The speech recognition technology in the related art is a technology of recognizing information concerning phonology (hereinafter, referred to as "phonological information") in information included in speech. In the common speech recognition technology, information concerning prosody which is information other than the phonological information included in speech (hereinafter, referred to as "prosodic information") is not always used positively.

However, there exist related arts using prosodic information, and for example, a technology in which prosodic information is used for properly determining a boundary position between basic blocks in a sentence is known (for example, refer to JP-A-04-66999 (Patent Document 1)).

SUMMARY OF THE INVENTION

However, in the related art described in the above Patent Document 1, prosodic information is secondarily used for improving accuracy of the speech recognition technology, and diversified information included in prosodic information is not clearly discriminated.

In human speech, there exist some cases in which the discrimination is difficult only by phonological information. For example, in Japanese, a speech "un" which represents affirmative intent and a speech "uun" which represents negative intent are the same speech from the viewpoint of the phonological information. In this case, it is difficult to discriminate between affirmative intent and negative intent only by phonological information included in speech, and it is necessary that the discrimination is performed based on so-called prosodic information such as information of "intonation patterns" or "phonological duration".

When processing concerning intonation is dealt with in speech signal processing, detection of a pitch frequency (or a pitch cycle) is widely used. However, there is a problem that an error is liable to occur due to the effect of noise and the like in the detection of the pitch frequency. Also in a whisper or speech of a low pitch property, an error is liable to occur in the detection of the pitch frequency. In the state in which the detection error of the pitch frequency is liable to occur, or with respect to a subject in which the detection error is liable to occur, it is difficult to perform discrimination based on the prosodic information.

The present invention addresses the above problems and it is desirable to effectively detect the pitch frequency and to perform speech recognition with high reliability based on prosodic characteristics of input speech even in the speech with large effect of noise, a whisper or speech of a low pitch property.

The present inventors have already proposed (Japanese Patent Application NO. 2006-161370) a method of performing prosodic discrimination according to relative pitch variation obtained based on the variation between two frequency characteristics of input speech which are temporally different without detecting the pitch frequency.

In the method proposed in the Japanese Patent Application No. 2006-161370, when performing discrimination based on prosodic characteristics of input speech, relative pitch variation obtained based on the variation in the frequency direction between two frequency characteristics of input speech which are temporally different is calculated, and recognition processing is performed based on the relative pitch variation.

The prosodic discrimination is performed by using the relative pitch variation between two frequency characteristics which are temporally different, thereby enabling robust discrimination even the speech with large effect of noise, a whisper or speech of a low pitch property, in which pitch frequency extraction is difficult in the related art.

Additionally, the present inventors have already proposed (Japanese Patent Application No. 2006-325780) a method in which one frequency characteristic of the two frequency characteristics is fixed. According to the method, it is possible to find a suitable relative pitch pattern with continuity, which is the same as the pitch pattern found by the common pitch frequency detection even in the case that voiceless sound or a silent segment is included in input speech.

In the above method of the related art in which the relative pitch variation is found by fixing one frequency characteristic, a problem of a so-called double pitch or a half pitch sometimes occur in the same manner as the common method of detecting the pitch frequency. The problem of the double pitch or the half pitch is the problem in which a component corresponding to a frequency which is double or half of a proper pitch frequency is wrongly detected because the component is stronger than a component corresponding to the original proper pitch frequency to be detected in a speech signal.

The present invention addresses the above problem, and in the configuration of embodiments of the invention, it is desirable to provide a speech analysis apparatus, a speech analysis method and a computer program capable of highly reliable speech recognition by calculating the relative pitch difference according to comparison with respect to a template frequency characteristic previously prepared and the relative pitch difference according to comparison with respect to a frequency characteristic of a temporally-adjacent frame at the same time, more specifically, by correcting an extraction error in consideration of the relative pitch difference according to comparison with respect to the temporally-adjacent frame when an extraction error to be an integral ratio of the original pitch frequency seemed to occur in the relative pitch difference according to comparison with respect to the template frequency characteristic.

According to an embodiment of the invention, a speech analysis apparatus analyzing prosodic characteristics of speech information and outputting a prosodic discrimination result includes an input unit performing input of speech information, an acoustic analysis unit analyzing frequency characteristics of respective analysis frames set in time series with respect to speech information inputted from the input unit and calculating relative pitch variation as variation information of frequency characteristics of respective analysis frames and a discrimination unit performing speech discrimination processing based on the relative pitch variation generated by the acoustic analysis unit, in which the acoustic analysis unit calculates a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the value is not less than the threshold, calculating an adjacent relative pitch difference which is a relative pitch difference between the frequency characteristic of the current analysis frame and the frequency characteristic of the previous frame, when the adjacent relative pitch difference is equal to or less than a previously set margin value, executing correction processing of adding or subtracting an octave of the current template relative pitch difference to calculate the relative pitch variation by applying the relative pitch difference as the relative pitch difference of the current analysis frame.

Further, in the speech analysis apparatus according to an embodiment of the invention, the acoustic analysis unit calculates the relative pitch variation by applying the current template relative pitch difference as the relative pitch difference of the current analysis frame when the difference absolute value between the previous template relative pitch difference and the current template relative pitch difference is equal to or less than the predetermined threshold.

Further, in the speech analysis apparatus according to an embodiment of the invention, the acoustic analysis unit calculates the relative pitch variation by applying the current template relative pitch difference as the relative pitch difference of the current analysis frame when the difference absolute value between the previous template relative pitch difference and the current template relative pitch difference is not less than the predetermined threshold as well as the adjacent relative pitch difference is not less than the previously set margin value.

Further, in the speech analysis apparatus according to an embodiment of the invention, the acoustic analysis unit calculates a cross-correlation matrix defining the relation between two frequency characteristics for calculating the relative pitch difference, calculating a value corresponding to a shift amount of an edge line connecting peak positions of values of configuration data of the cross-correlation matrix from the principal diagonal of the cross-correlation matrix as the relative pitch difference.

Further, in the speech analysis apparatus according to an embodiment of the invention, the acoustic analysis unit generates frequency characteristic information in which the frequency characteristic information is expressed on a logarithmic frequency axis, and when the threshold is T and the margin value is $\delta$, performing processing applying a threshold and a margin value defined by the following formula.

$$T = \log(2) - \delta$$

Further, in the speech analysis apparatus according to an embodiment of the invention, the discrimination unit performs speech discrimination processing by comparing parameters corresponding to a prosodic discrimination unit dictionary previously stored in a storage unit to relative pitch variation data generated by the acoustic analysis unit.

Further, in the speech analysis apparatus according to an embodiment of the invention, the discrimination unit performs speech discrimination processing according to processing applying any of a DP (Dynamic Programming) matching, a neural network, a HMM (Hidden Markov Model).

Further, in the speech analysis apparatus according to an embodiment of the invention, the speech analysis apparatus further includes a speech recognition unit outputting text information corresponding to input speech data from the input unit as a speech recognition result and a result selection unit outputting the speech recognition result by applying a discrimination result of the discrimination unit and a discrimination result of the speech recognition unit.

Further, in the speech analysis apparatus according to an embodiment of the invention, the result selection unit outputs the speech recognition result to which a prosodic discrimination result discriminated in the discrimination unit is added when the speech recognition result corresponds to a specific word as a result of comparison between the speech recognition result in the speech recognition unit and specific words stored in the specific word storage unit, and outputs the speech recognition result as it is when the speech recognition result does not correspond to a specific word.

According to an embodiment of the invention, a speech analysis method analyzing prosodic characteristics of speech information and outputting a prosodic discrimination result in a speech analysis apparatus includes the steps of performing input of speech information by an input unit, analyzing frequency characteristics of respective analysis frames set in time series with respect to speech information inputted from the input unit and calculating relative pitch variation as variation information of frequency characteristics of respective analysis frames by an acoustic analysis unit and performing speech discrimination processing by a discrimination unit based on the relative pitch variation generated by the acoustic analysis unit, in which the step performed by the acoustic analysis unit has the steps of calculating a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the value is not less than the threshold, calculating an adjacent relative pitch difference which is a relative pitch difference between the frequency characteristic of the current analysis frame and the frequency characteristic of the previous frame, and when the adjacent relative pitch difference is equal to or less than a previously set margin value, executing correction processing of adding or subtracting an octave of the current template relative pitch difference to calculate the relative pitch variation by applying the relative pitch difference as the relative pitch difference of the current analysis frame.

Further, in the speech analysis method according to an embodiment of the invention, the step performed by the acoustic analysis unit is the step of calculating the relative pitch variation by applying the current template relative pitch difference as the relative pitch difference of the current analysis frame when the difference absolute value between the previous template relative pitch difference and the current template relative pitch difference is equal to or less than the predetermined threshold.

Further, in the speech analysis method according to an embodiment of the invention, the step performed by the acoustic analysis unit is the step of calculating the relative pitch variation by applying the current template relative pitch difference as the relative pitch difference of the current analysis frame when the difference absolute value between the previous template relative pitch difference and the current template relative pitch difference is not less than the predetermined threshold as well as the adjacent relative pitch difference is not less than the previously set margin value.

Further, in the speech analysis method according to an embodiment of the invention, the step performed by the acoustic analysis unit has the steps of calculating a cross-correlation matrix defining the relation between two frequency characteristics for calculating the relative pitch difference and calculating a value corresponding to a shift amount of an edge line connecting peak positions of values of configuration data of the cross-correlation matrix from the principal diagonal of the cross-correlation matrix as the relative pitch difference.

Further, in the speech analysis method according to an embodiment of the invention, the step performed by the acoustic analysis unit has the steps of generating frequency characteristic information in which the frequency characteristic information is expressed on a logarithmic frequency axis, and when the threshold is T and the margin value is δ, performing processing applying a threshold and a margin value defined by the following formula.

$$T = \log(2) - \delta$$

Further, in the speech analysis method according to an embodiment of the invention, the step performed by the discrimination unit is the step of performing speech discrimination processing by comparing parameters corresponding to a prosodic discrimination unit dictionary previously stored in a storage unit to relative pitch variation data generated by the acoustic analysis unit.

Further, in the speech analysis method according to an embodiment of the invention, the step performed by the discrimination unit is the step of performing speech discrimination processing according to processing applying any of a DP (Dynamic Programming) matching, a neural network, a HMM (Hidden Markov Model).

Further, in the speech analysis method according to an embodiment of the invention, the speech analysis method further includes the steps of outputting text information corresponding to input speech data from the input unit as a speech recognition result by a speech recognition unit and outputting the speech recognition result by applying a discrimination result of the discrimination unit and a discrimination result of the speech recognition unit by the result selection unit.

Further, in the speech analysis method according to an embodiment of the invention, the step performed by the result selection unit is the step of outputting the speech recognition result to which a prosodic discrimination result discriminated in the discrimination unit is added when the speech recognition result corresponds to a specific word as a result of comparison between the speech recognition result in the speech recognition unit and specific words stored in the specific word storage unit, or outputting the speech recognition result as it is when the speech recognition result does not correspond to a specific word.

According to an embodiment of the invention, a computer program allowing a speech analysis apparatus to analyze prosodic characteristics of speech information and to output a prosodic discrimination result includes the steps of allowing an input unit to perform input of speech information, allowing an acoustic analysis unit to analyze frequency characteristics of respective analysis frames set in time series with respect to speech information inputted from the input unit and to calculate relative pitch variation as variation information of frequency characteristics of respective analysis frames and allowing a discrimination unit to perform speech discrimination processing based on the relative pitch variation generated by the acoustic analysis unit, in which the step performed by the acoustic analysis unit has the steps of calculating a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the value is not less than the threshold, calculating an adjacent relative pitch difference which is a relative pitch difference between the frequency characteristic of the current analysis frame and the frequency characteristic of the previous frame, and when the adjacent relative pitch difference is equal to or less than a previously set margin value, executing correction processing of adding or subtracting an octave of the current template relative pitch difference to calculate the relative pitch variation by applying the relative pitch difference as the relative pitch difference of the current analysis frame.

A computer program according to an embodiment of the invention is the computer program which can be provided by a recording medium, a communication medium to be provided in a form readable by a computer, for example, with respect to a general-purpose computer system which can execute various program codes. Such program is provided in a form readable by a computer, thereby realizing processing according to the program on a computer system.

Further other characteristics and advantages of the invention will become clear by explanation in more detail based on a later-described embodiment of the invention or attached drawings. The system in the specification indicates a logical aggregate of plural apparatuses, and apparatuses of respective configurations are not always in the same casing.

According to the configuration of an embodiments of the invention, in the prosodic discrimination processing performing discrimination based on prosodic characteristics of input speech, a first relative pitch difference is extracted from comparison between a frequency characteristic corresponding to an analysis frame generated from input speech and a template frequency characteristic as well as a second relative pitch difference is calculated from comparison between the frequency characteristic of the analysis frame and a frequency characteristic of a previous frame, and correction processing of the relative pitch difference is performed in consideration of continuity of relative pitches between adjacent frames based on the two relative pitch difference. According to the configuration, a double-pitch or half-pitch extraction error can be cancelled, which enables highly accurate and robust prosodic discrimination.

BRIEF DESCRIPTION OF THE DRAWINGS

FIG. 1 is a block diagram showing a configuration example of a speech analysis apparatus according to an embodiment of the invention;

FIG. 2 is a block diagram showing a configuration example of a prosodic discrimination unit in the speech analysis apparatus according to an embodiment of the invention;

FIG. 4 is a flowchart explaining a processing sequence of a frequency characteristic analysis unit in the prosodic discrimination unit;

FIG. 6 is a flowchart explaining a fundamental processing sequence of a relative pitch variation calculation unit in the prosodic discrimination unit;

FIG. 11A and FIG. 11B are drawings graphically expressing a cross-correlation matrix generated based on a template frequency characteristic and a frequency characteristic of an analysis frame and explaining the relative pitch difference;

FIG. 18A and FIG. 18B are drawings explaining an example of relative pitch variation data generated by the processing of the relative pitch variation calculation unit.

DESCRIPTION OF THE PREFERRED EMBODIMENTS

Figure 3A:
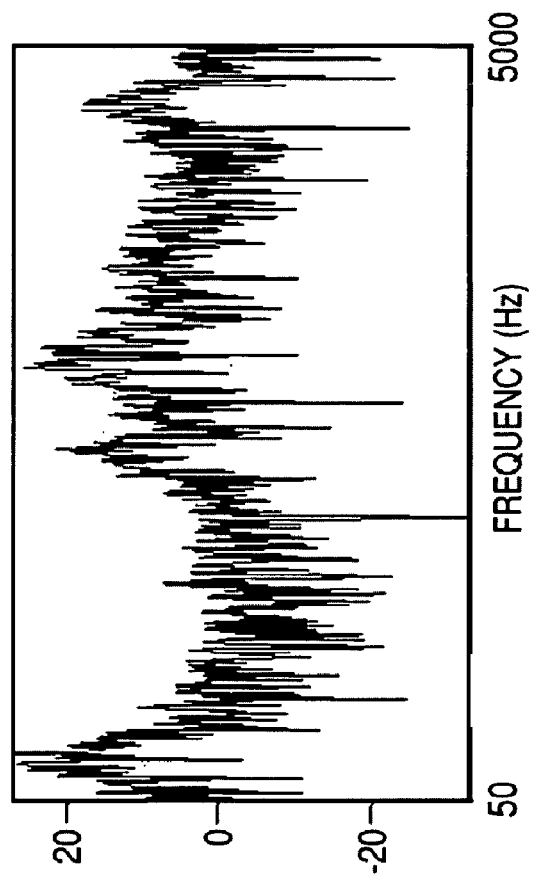
FIG. 3A and FIG. 3B are graphs showing frequency characteristics of a normal speech and a whisper.

Hereinafter, a specific embodiment to which the invention is applied will be described in detail with reference to the drawings. First, a system configuration and the whole processing flow will be explained, and next, internal processing of an acoustic analysis unit will be explained in detail.

FIG. 1 is a block diagram showing a configuration of a speech analysis apparatus 11 to which the invention is applied. The speech analysis apparatus 11 includes an input unit 31, a prosodic discrimination unit 32, a speech recognition unit 33, a result selection unit 34, a specific word storage unit 35, and an output unit 36.

The input unit 31 receives the input of, for example, a speech signal acquired by a microphone and the like, or a speech signal supplied from another apparatus.

The prosodic discrimination unit 32 performs prosodic discrimination processing of the inputted speech signal. The prosody indicates characteristics of speech information which are difficult to be expressed as text such as intonation, speed variation and size variation. The details of prosodic discrimination processing by the prosodic discrimination unit 32 will be described later.

The speech recognition unit 33 performs speech recognition processing of the inputted speech signal. In this case, any well-known speech recognition processing may be performed.

The result selection unit 34 outputs a speech recognition result to which a prosodic discrimination result by the prosody discrimination unit 32 is added to the output unit 36 when the processing result by the speech recognition unit 33 is a specific word recorded in the specific word storage unit 35, and supplies the processing result by the speech recognition unit 33 as it is to the output unit 36 when the processing result by the speech recognition unit 33 is not a specific word recorded in the specific word storage unit 35.

The specific word storage unit 35 records specific word information used for processing of the speech recognition unit 33. Specifically, specific words which should be recognized by using the prosody such as "un" are stored in the specific word storage unit 35.

The output unit 36 outputs the speech recognition result supplied from the result selection unit 34 to the outside, that is, the unit gives instructions of displaying the result on the screen, outputting the result as sound, and further, operating another apparatus by using the recognition result.

The embodiment has a configuration in which two processing units of the prosody discrimination unit 32 and the speech recognition unit 33 are included and processing results of the two processing units are selected at the result selection unit 34, however, it is also preferable to have the setting in which a discrimination result of only the prosodic discrimination unit 32 is outputted, not having the speech recognition unit 33 and having only the prosody discrimination unit 32.

Next, the operation of the speech analysis apparatus 11 will be explained. In FIG. 1, speech inputted from the input unit 31 is supplied to the prosodic discrimination unit 32 and the speech recognition unit 33. In each of the prosodic discrimination unit 32 and the speech recognition unit 33, processing is performed with respect to the input speech data, as a result, a speech type (or speech intent of a user) discriminated based on a prosodic pattern of the input speech data is outputted from the prosodic discrimination unit 32 as a prosodic discrimination result, and text information corresponding to input speech data is outputted from the speech recognition unit 33 as a speech recognition result. These prosodic discrimination result and speech recognition result are given to the result selection unit 34.

In the result selection unit 34, the given speech recognition result is compared with specific words stored in the specific word storage unit 35, and when the speech recognition result corresponds to a specific word, the prosodic discrimination result is added to or integrated with the speech recognition result to be outputted from the output unit 36. When the speech recognition result does not correspond to any specific word, the speech recognition result is outputted from the output unit 36 as it is.

For example, "un" is set as a specific word, and when three kinds of speech types which are "un" representing affirmation, "uun" representing negation and "un?" representing question are discriminated based on the prosodic discrimination result in the prosodic discrimination unit 32, information concerning either one of speech types (speech intent of the user) of affirmative, negative or question is added to the recognition result with respect to the specific word "un".

It is also preferable that, for example, the prosodic discrimination unit 32 analyzes the supplied speech and discriminates the type of the speech as any of "affirmative", "negative", "question" and "others" meaning that the speech belongs to the type other than these three speech types. The result selection unit 34 outputs only the speech recognition result from the speech recognition unit 33 when "others" is given as the prosodic discrimination result and outputs the speech recognition result from the speech recognition unit 33 to which the prosodic discrimination result from the prosodic discrimination result 32 is added when the prosodic discrimination result is any of "affirmative", "negative" and "question". In such case, it is possible to omit the specific word storage unit 35.

FIG. 2 is a block diagram showing a configuration of the prosodic discrimination unit 32 of FIG. 1. The prosodic discrimination unit 32 shown in FIG. 2 includes an input unit 51, an acoustic analysis unit 52, a discrimination unit 53, a parameter storage unit 54 and an output unit 55.

As described above, the configuration of FIG. 1 is the configuration example in which two processing units of prosody discrimination unit 32 and the speech recognition unit 33 are included and processing results of the two processing units are selected at the result selection unit 34, however, in the case of the setting in which only prosodic discrimination unit 32 is included without the speech recognition unit 33, the configuration shown in FIG. 2 will form the whole configuration of a speech analysis apparatus.

In the configuration shown in FIG. 2, the input unit 51 inputs a speech signal from the input unit 31 shown in FIG. 1, including, for example, a device for inputting a speech signal such as a microphone, an amplifier which amplifies the input signal, an AD converter and the like which converts the input signal into a digital signal. In the input unit 51, after the input signal is sampled, for example, at 16 kHz, the signal is transmitted to the acoustic analysis unit 52.

The acoustic analysis unit 52 extracts a feature amount necessary for the recognition from the inputted speech signal, transmitting the feature amount to the discrimination unit 53. The internal processing of the acoustic analysis unit 52 in the embodiment will be described later.

In the discrimination unit 53, recognition processing with respect to unknown speech data is performed by using parameters in the parameter storage unit 54 created in advance based on the feature amounts obtained by performing acoustic analysis with respect to speech data for learning.

In this case, the recognition processing with respect to the unknown speech data is processing of selecting a prosodic discrimination unit corresponding to the input from a given prosodic discrimination unit dictionary with respect to the inputted speech signal. As a recognition method, a method using a DP (Dynamic Programming) matching, a neural network, a HMM (Hidden Markov Model) or the like is used.

The DP matching is a method in which a standard pattern called as a template is calculated in advance from the feature amount obtained by analyzing each speech signal as a parameter, the parameter is recorded in the parameter storage unit 54, and the feature amount of an unknown speech is compared with each parameter to find a parameter which is determined to be closest. In order to absorb variations of speech speed, a method of expanding and contracting the time axis so as to minimize distortion with respect to the template according to a technique called as a dynamic time warping.

The neural network is configured to perform recognition according to a network model imitating the configuration of a human brain, in which weighting factors of paths are determined in advance as parameters by learning process, and these parameters are stored in the parameter storage unit 54. The distance with respect to each prosodic discrimination unit in the prosodic discrimination unit dictionary is calculated based on the output obtained by inputting the feature amount of unknown speech into the network to determine the prosodic discrimination unit corresponding to the inputted speech signal.

The HMM is configured to perform recognition according to a probabilistic model, in which transition probability and output symbol probability are determined with respect to a state transition model based on learning data to determine a prosodic discrimination unit from occurrence probability of each model with respect to the feature amount of unknown speech.

As described above, the recognition processing in the discrimination unit 53 includes the leaning process and the recognition process. In the learning process, parameters determined from learning data in advance, that is, templates, weighting factors in the network model, statistic parameters of the probability model and the like are calculated and stored in the parameter storage unit 54.

In the recognition process, after the acoustic analysis of the inputted unknown speech signal is performed, scoring of the distance or the occurrence probability according to the recognition method is performed to respective prosodic discrimination units in the given prosodic discrimination unit dictionary, and the unit having the highest score or plural numbers of units of the top are selected as a recognition result.

The recognition result obtained in the discrimination unit 53 is transmitted to the output unit 55. The output unit 55 gives instructions of displaying the transmitted recognition result on a screen or outputting as a sound, and further, operating another device by using the recognition result.

The detection of the pitch frequency in the related art is premised on that the time length of a pitch cycle as one cycle of vocal cord vibration in speech (or a pitch frequency represented as the inverse number of the pitch cycle) is uniquely determined. The processing of determining the pitch frequency uniquely means that the center frequency of a peak component existing at the lowest frequency is calculated in the distribution of a frequency characteristic corresponding to the speech.

Figure 3B:
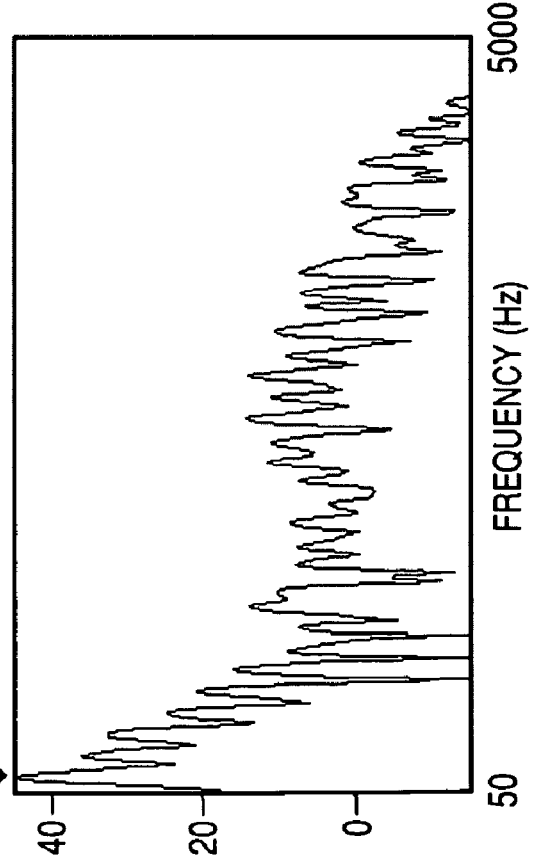

A processing example of detecting the pitch frequency will be explained with reference to FIG. 3A and FIG. 3B. FIG. 3A shows a frequency characteristic of a normal speech and FIG. 3B shows a frequency characteristic of a whisper. For example, in the case of the frequency characteristic of the normal speech as shown in FIG. 3A, a frequency "fp" corresponds to the pitch frequency. However, in the case that the speech is mixed in noise or in the case that the speech of a low pitch property such as a whisper, the processing of determining the pitch frequency in the related art as described above will be difficult. For example, in the case of the frequency characteristic of the whisper as shown in FIG. 3B, it is difficult to detect the center frequency of the peak component existing at the lowest frequency.

Correspondingly, in the prosodic discrimination unit 32, even when it is difficult to detect the pitch frequency such as the whisper as shown in FIG. 3B, it is possible to avoid processing depending on the peak property of the frequency characteristic, in which the proper pitch frequency is uniquely determined by using the relative pitch variation, thereby capturing variations of intonation robustly.

In the pitch frequency detection in the past, a frequency characteristic corresponding to a speech is taken as one feature amount distribution and a desired feature amount (pitch frequency) is extracted from one distribution, whereas in the prosodic discrimination unit 32, variation are directly found without determining the pitch frequency, processing of normalizing pitch variation range indicating the pitch frequency and the variation range thereof is not necessary.

The above processing is chiefly realized by the processing executed in the acoustic analysis unit 52. Hereinafter, specific configuration and operation of the acoustic analysis unit 52 will be explained in detail.

<Internal Processing of the Acoustic Analysis Unit>

The acoustic analysis unit 52 includes a frequency characteristic analysis unit 61 and a relative pitch variation calculation unit 62 as shown in FIG. 2.

The frequency characteristic analysis unit 61 performs transformation processing from the inputted speech signal into the frequency characteristic. The flow of specific processing in the frequency characteristic analysis unit 61 will be explained with reference to a flowchart shown in FIG. 4.

Figure 5A:
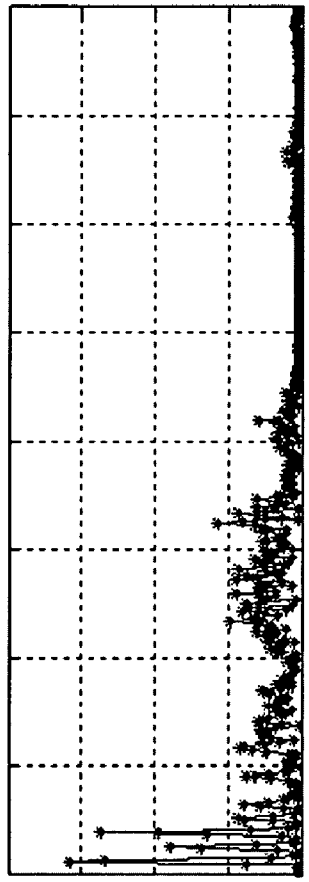
FIG. 5A to FIG. 5C are graphs showing specific examples of the frequency characteristic analysis unit of the prosodic discrimination unit.

First, the frequency characteristic analysis unit 61 transforms the inputted speech signal into a frequency domain using time frequency transformation processing such as FFT (Fast Fourier Transform) analysis to obtain a common frequency characteristic. An example of frequency characteristics is shown in FIG. 5A.

Figure 5B:
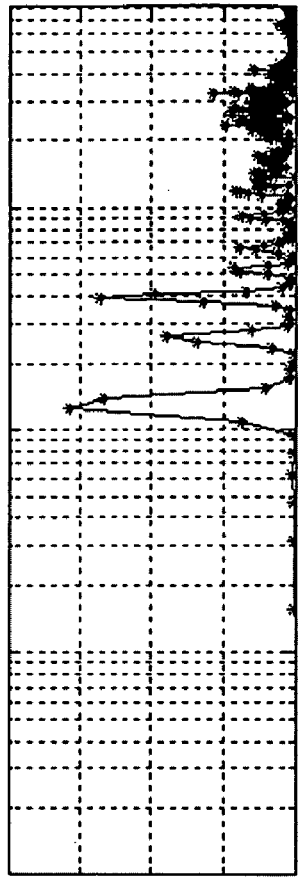

Next, the process proceeds to Step S32 of the flowchart shown in FIG. 4, in which a frequency axis in the common frequency characteristic is made logarithmic to thereby be transformed into a frequency characteristic on a logarithmic frequency axis. An example of the frequency characteristic on the logarithmic frequency axis is shown in FIG. 5B.

Figure 5C:
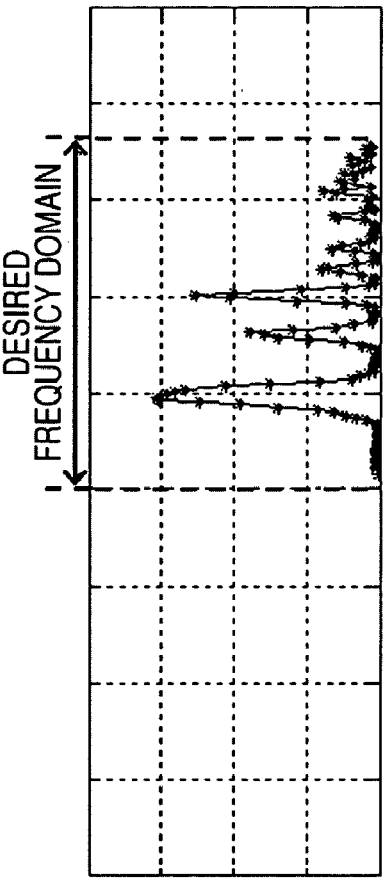

Next, the process proceeds to Step S33 of the flowchart shown in FIG. 4, in which only a desired portion of the frequency domain is taken in the frequency characteristic on the logarithmic frequency axis, and the result is outputted as a result of the frequency characteristic analysis unit. FIG. 5C exemplifies the frequency characteristic in which only the desired portion of the frequency domain is extracted from the frequency characteristic of FIG. 5B.

The frequency characteristic shown in FIG. 5C is obtained as the result of analysis in the frequency characteristic analysis unit 61 as described above, and the frequency characteristic is transmitted to the relative pitch variation calculation unit 62. The frequency characteristic analysis unit 61 generates frequency characteristics as shown in FIG. 5C at predetermined fixed time intervals, that is, at each analysis frame set in time series with respect to speech information inputted from the input unit, sequentially outputting them to the relative pitch variation calculation unit 62.

Next, a processing example in the relative pitch variation calculation unit 62 will be explained with reference to a flow chart shown in FIG. 6. The flow shown in FIG. 6 is the outline of the processing in the relative pitch variation calculation unit 62. The relative pitch variation calculation unit 62 of the speech analysis apparatus according to the embodiment of the invention further executes processing following the flow shown in FIG. 17 which will be described later, taking the flow shown in FIG. 6 as a fundamental processing.

The flow of FIG. 6 will be explained. First, the relative pitch variation calculation unit 62 calculates a cross-correlation matrix between frequency characteristics by using two frequency characteristics in Step S41 of the flowchart shown in FIG. 6.

In the speech analysis apparatus according to the embodiment of the invention, combinations of the following two different frequency characteristics are applied to calculate the cross-correlation matrix.

(a) two frequency characteristics in analysis frames which are temporally different (b) frequency characteristics in an analysis frame and a fixed template frequency characteristic The processing of (b) will be explained in detail in a later chapter. Here, the case of (a) in which two frequency characteristics in analysis frames which are temporally different will be explained. The two frequency characteristics in analysis frames which are temporally different transmitted from the above-described frequency characteristic analysis unit 61 are denoted by column vectors X, Y, and a degree of the column vector is denoted by N. These column vectors X, Y are represented by the following formulas 1, 2, and at that time, a cross-correlation matrix M is a matrix represented by a product of the vector X and a transposed vector $Y^T$ as shown by a formula 3.

$$X=(x1,x2,\ldots xN)^T \quad \text{Formula (1)}$$

$$Y=(Y1,y2,\ldots yN)^T \quad \text{Formula (2)}$$

$$M=X\times Y^T \quad \text{Formula (3)}$$

Figure 7:
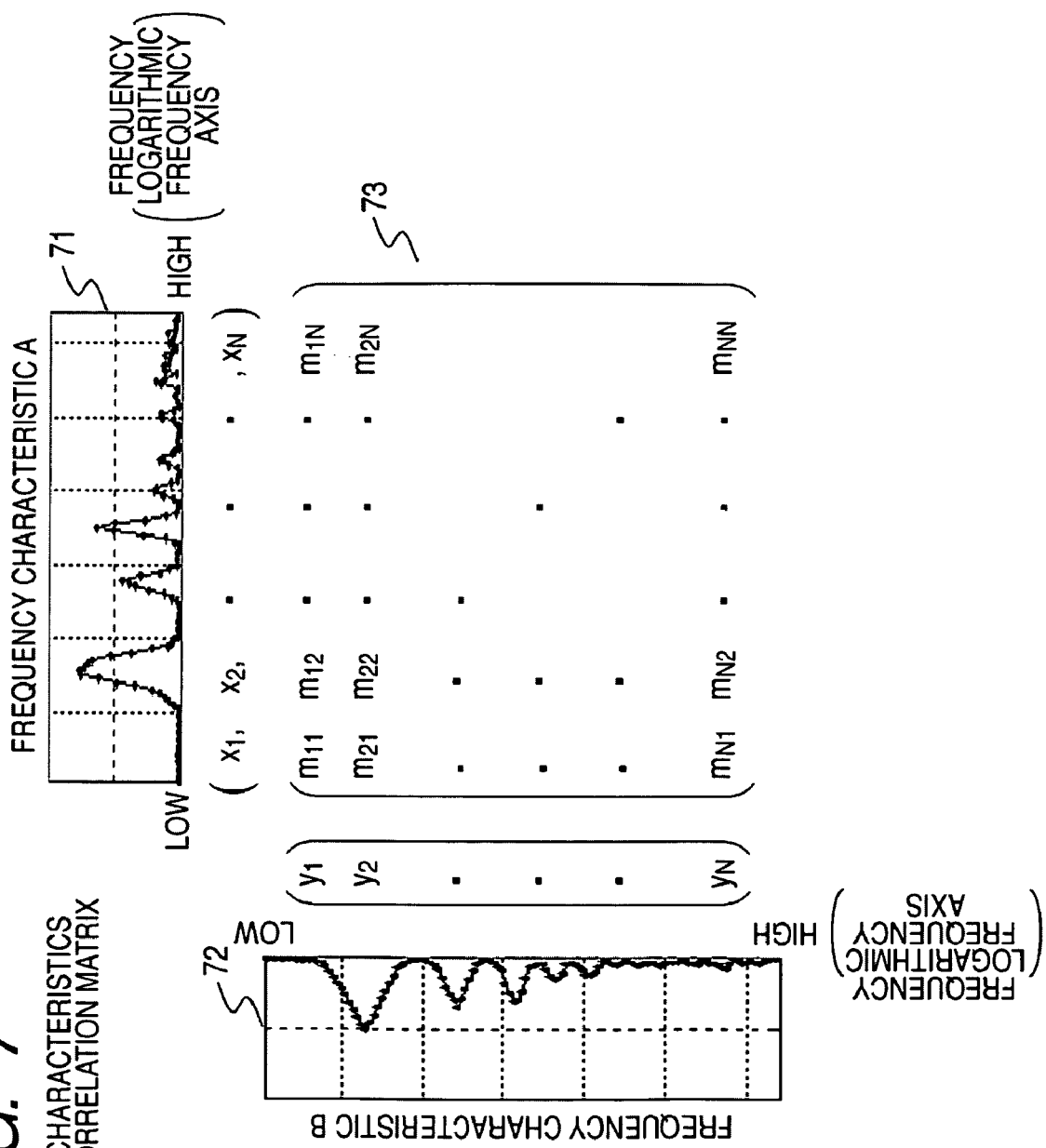
FIG. 7 is a drawing explaining a cross-correlation matrix generated based on two frequency characteristics.

The cross-correlation matrix M represented by the above formula (formula 3) is shown in FIG. 7. In FIG. 7, the cross-correlation matrix M73 is shown, which satisfies the above relational expression (formula 3) when two frequency characteristics in analysis frames which are temporally different are A71, B72, further, when the frequency characteristic A71 is the column vector X and the frequency characteristic B72 is the column vector Y. The two frequency characteristics A71 and the frequency characteristics B72 are frequency characteristics corresponding to analysis frames which are temporally different, corresponding to the frequency characteristics explained with reference to FIG. 5C, respectively.

That is, these frequency characteristics correspond to data (FIG. 5C) in which only a desired portion of the frequency domain in the frequency characteristic (FIG. 5B) on the logarithmic frequency axis obtained by allowing the frequency axis to be logarithmic in the common frequency characteristic (FIG. 5A) obtained by performing transformation into the frequency domain according to the time frequency transformation processing such as FFT (Fast Fourier Transform) analysis. In the frequency characteristic A71 shown in FIG. 7, the horizontal axis is the logarithmic frequency axis, in which the frequency increases from left to right. In the frequency characteristic B72, the frequency increases from above to below.

Figure 8:
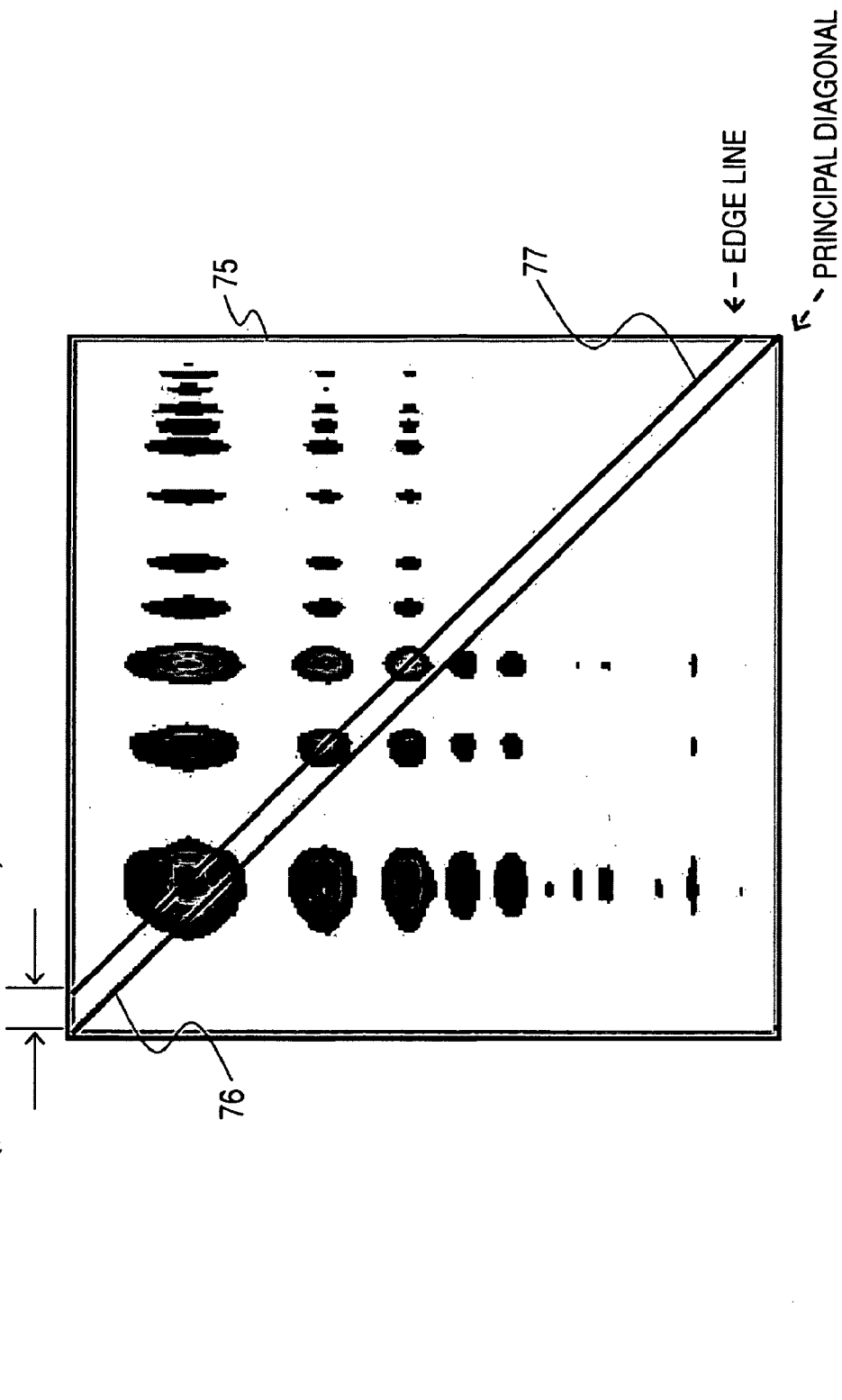
FIG. 8 is a drawing graphically expressing a cross-correlated matrix generated based on two frequency characteristics and explaining a relative pitch difference.

A cross-correlation matrix M73 shown in FIG. 7 can be shown as a cross-correlation matrix M75 as shown in FIG. 8 when numeral values included in the matrix are graphically displayed changing density (contrast) according to numeral values.

Figure 9:
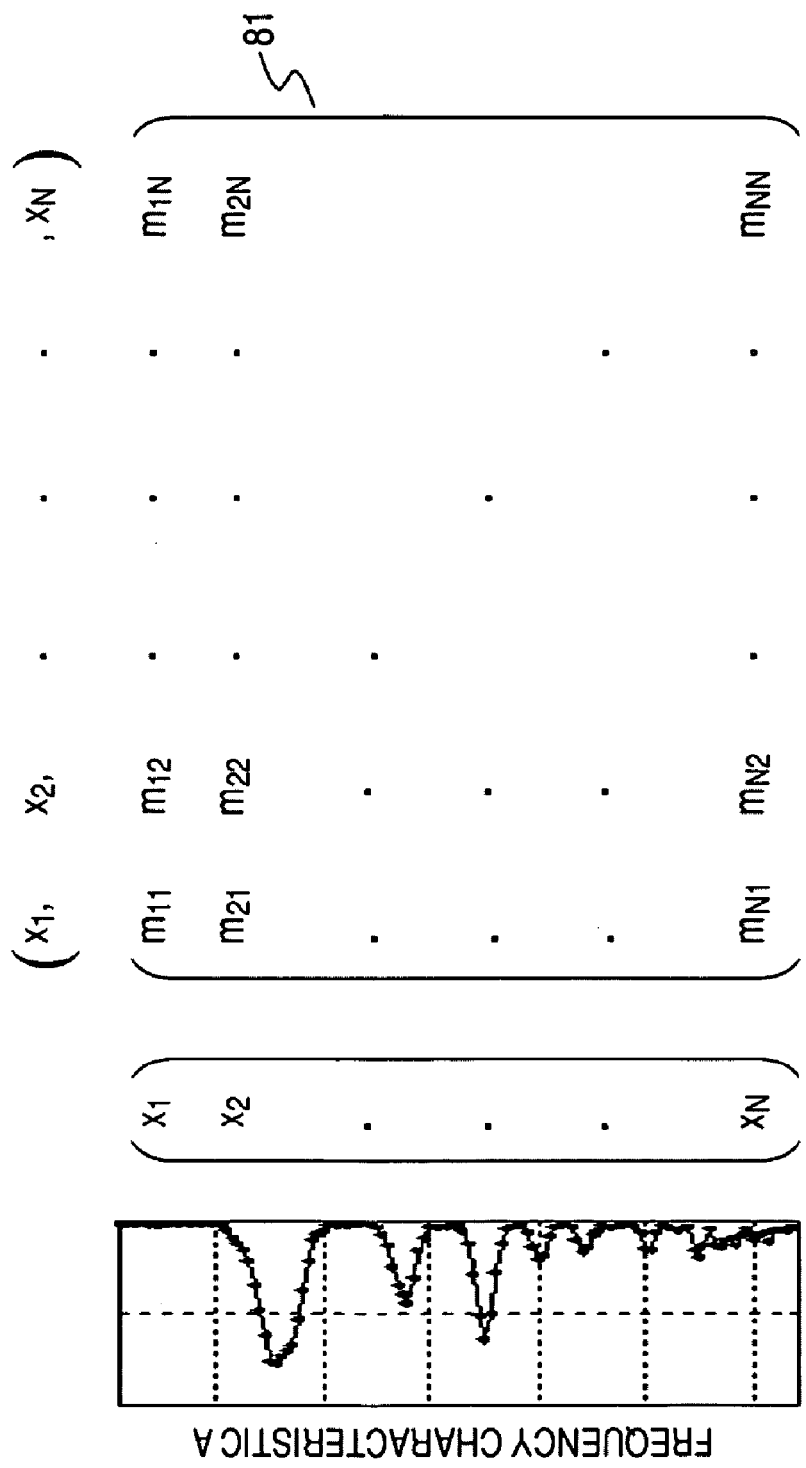
FIG. 9 is a drawing explaining an autocorrelation matrix generated based on one frequency characteristic.
Figure 10:
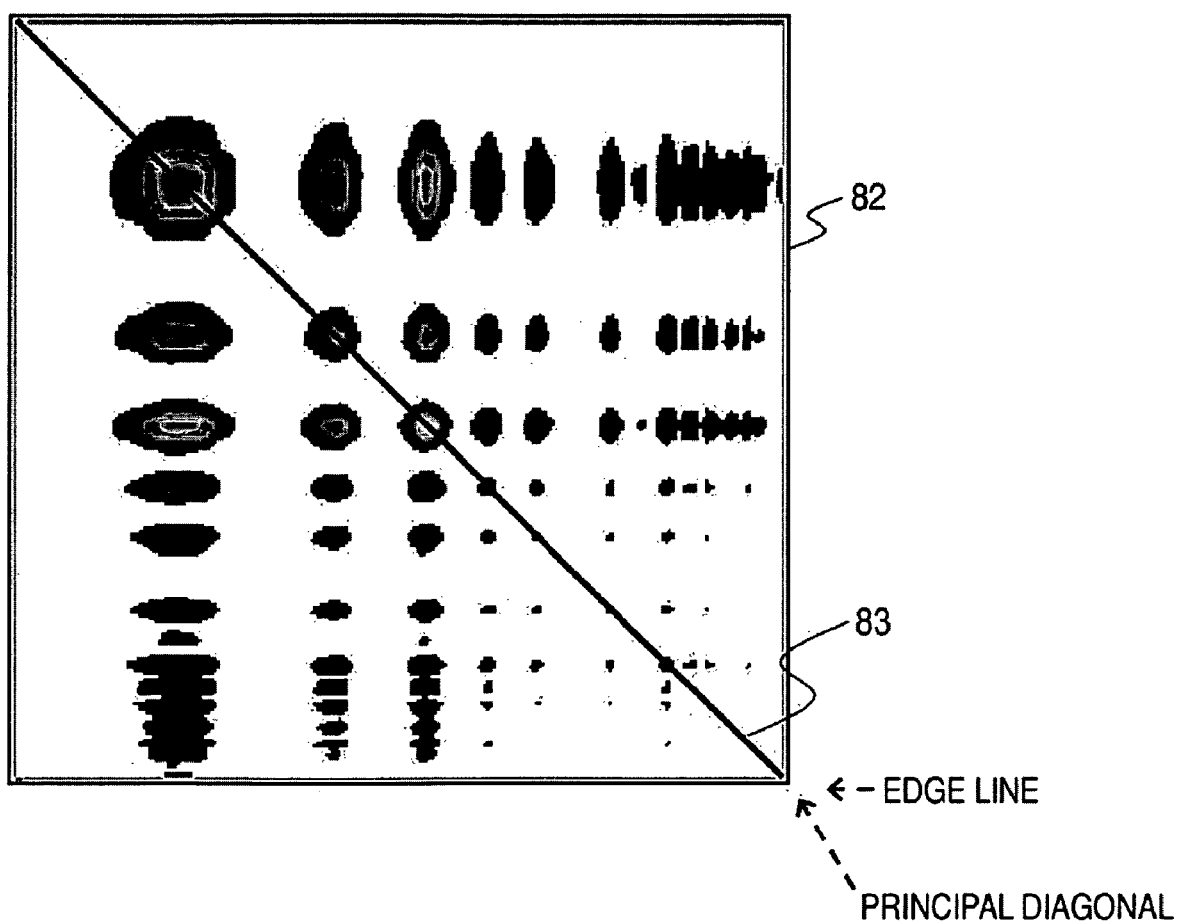
FIG. 10 is a drawing graphically expressing an autocorrelation matrix generated based on one frequency characteristic and explaining an edge line and a principal diagonal.

As a comparative example, when two frequency characteristics are the same, that is, an autocorrelation matrix 81 calculated by using only the column vector X representing one of the frequency characteristics is shown in FIG. 9 and an autocorrelation matrix 82 in which the autocorrelation matrix 81 is graphically displayed by numerical values is shown in FIG. 10, respectively.

As can be seen from FIG. 9 and FIG. 10, the autocorrelation matrix obtained by only one frequency characteristic is a symmetric matrix, and a vector (power spectrum) calculated from the square of amplitude of the frequency characteristic corresponds to a principal diagonal 83 of the autocorrelation matrix. The power spectrum will be an edge line 83 connecting (the squares of) respective peaks of frequency characteristic when comparing with diagonal direction components other than the principal diagonal in the autocorrelation matrix.

On the other hand, in the cross-correlation matrix between the two frequency characteristics in analysis frames which are temporally different as explained with reference to FIG. 7 and FIG. 8, an edge line 77 is positioned at a diagonal direction component shifted from a principal diagonal 76 of the matrix as shown in FIG. 8.

As shown in FIG. 8, the reason that the edge line is shifted from the principal diagonal in the cross-correlation matrix obtained from the two frequency characteristics in analysis frames which are temporally different is that the pitch frequency differs in respective two frequency characteristics. A frequency position of a peak component in respective frequency characteristics is almost at a position of integral multiple of each pitch frequency. In the two frequency characteristics in analysis frames which are temporally different, the pitch frequency varies between the analysis frames. In the cross-correlation matrix (the frequency axis takes logarithmic expression) obtained from two frequency characteristics having different pitch frequencies, the edge line connecting corresponding respective peaks between the two frequency characteristics appears on the diagonal direction component shifted in parallel with the principal diagonal of the cross-correlation matrix. The deviation of the edge line from the principal diagonal, or a shift amount corresponds to the difference of the pitch frequencies (logarithmic values) between the two frequency characteristics.

That is, in the cross-correlation matrix obtained from the two frequency characteristics in analysis frames which are temporally different, the shift amount of the edge line from the principal diagonal is calculated to thereby calculate the difference of logarithmic pitch frequencies between analysis frames (referred to as "relative pitch difference") without calculating pitch frequencies in respective analysis frames. It is the relative pitch difference shown in FIG. 8.

As two frequency characteristics in analysis frames which are temporally different, for example, frequency characteristics in respective two analysis frames which are temporally adjacent to each other can be used. For example, when analysis frames are set at predetermined time intervals, the relative pitch difference between respective analysis frames which are temporally adjacent to each other can be calculated.

The relative pitch variation calculation unit 62 of the acoustic analysis unit 52 calculates the cross-correlation matrix defining the relation between two frequency characteristics for calculating the relative pitch differences as described above, calculating a value corresponding to a shift amount of a edge line connecting peak positions of values in configuration data of the cross-correlation matrix from the principal diagonal of the cross-correlation matrix as the relative pitch difference.

Subsequently, the relative pitch difference between adjacent analysis frames are integrated in the desired number of analysis frames to thereby calculate the relative pitch variation in the desired number of frames. As a method of deciding the desired number of frames in this case, the discrimination accuracy in the leaning process in the discrimination unit 53 can be taken as a reference.

In the above example, two frequency characteristics in analysis frames which are temporally different are used for calculating the relative pitch difference, however, it is also preferable that one of frequency characteristics (to be compared) in the two different frequency characteristics used for calculating the relative pitch difference is allowed to be a fixed frequency characteristic and the other frequency characteristic is allowed to be frequency characteristics of each analysis frame generated based on a speech waveform to be inputted, thereby calculating the relative pitch difference based on the fixed frequency characteristic and the frequency characteristic of the analysis frame to be measured.

For example, as the fixed frequency characteristic, a template-type frequency characteristic data (it is referred to as a "template frequency characteristic") prepared in advance and stored in a memory of the speech analysis apparatus can be used.

Examples of a template frequency characteristic, a frequency characteristic of an analysis frame and a cross-correlation matrix (density expression) calculated by the two frequency characteristics are shown in FIG. 11B. For the sake of comparison, the cross-correlation matrix with respect to frequency characteristics in analysis frames which are temporally different explained with reference to FIG. 7 and FIG. 8 is shown in FIG. 11A.

Figure 12:
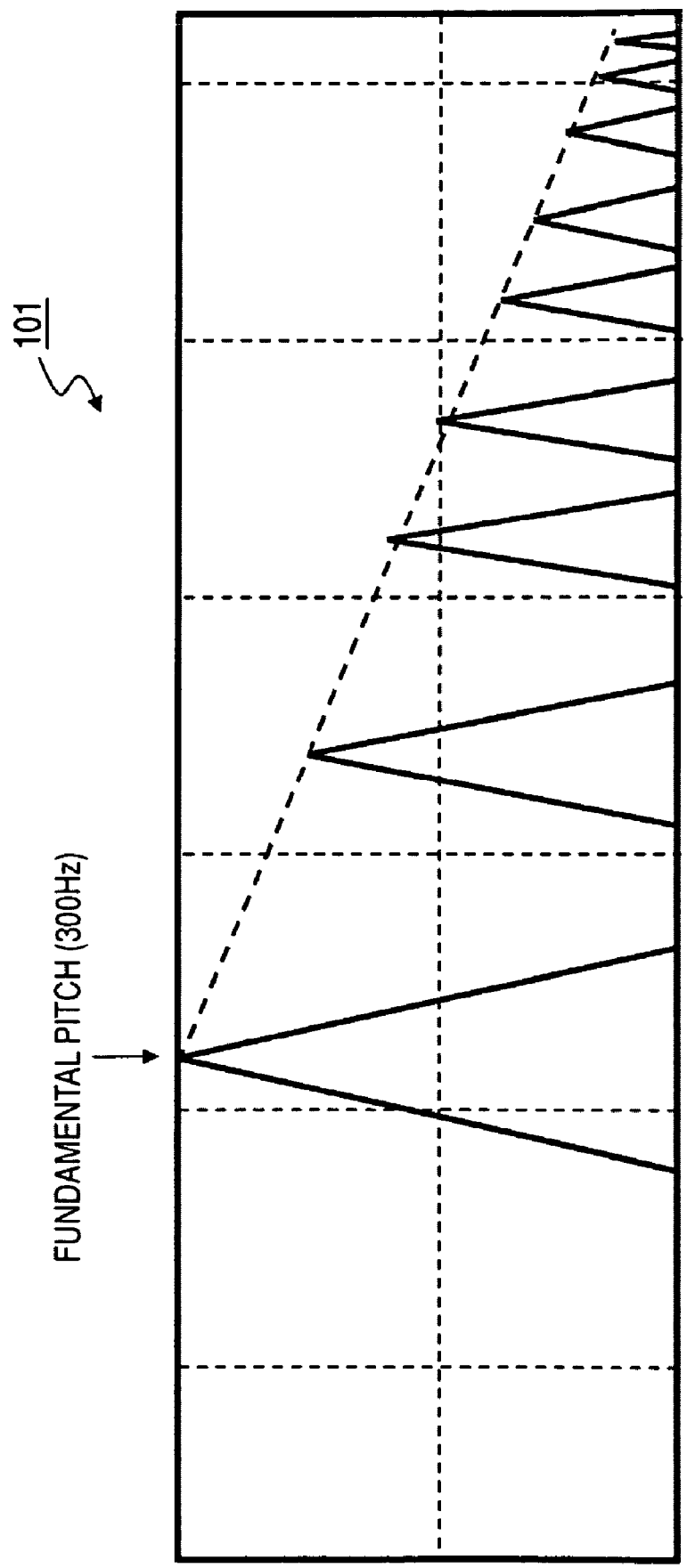
FIG. 12 is a drawing explaining a configuration example of a template frequency characteristic.

In FIG. 11B, a template frequency characteristic 101, a frequency characteristic 102 obtained from one analysis frame as a measured result and a cross-correlation matrix (density expression) 103 of these two frequency characteristics 101, 102 are shown. The template frequency characteristic 101 is a data creating a frequency characteristic in simulation, in which the size of a harmonic component with respect to a fundamental pitch is linearly attenuated, taking a certain pitch frequency (300 Hz) as the fundamental pitch as shown FIG. 12. For example, such simulative data can be applied as a template.

As shown in FIG. 11B, the relative pitch difference can be calculated by using the cross-correlation matrix 103 calculated from the template frequency characteristic 101 and the frequency characteristic 102 of the analysis frame.

As described above, in the cross-correlation matrix (the frequency axis takes logarithmic expression) obtained from two frequency characteristics having different pitch frequencies, an edge line 112 connecting corresponding respective peaks between the two frequency characteristics appears on a diagonal direction component shifted from a principal diagonal 111 in parallel in the cross-correlation matrix. The deviation or the shift amount of the edge line 112 from the principal diagonal 111 will be the difference of pitch frequencies (diagonal values) between the two frequency characteristics, namely, the relative pitch difference.

In the case of the example shown in FIG. 11B, the relative pitch difference with respect to the absolute reference (300 Hz in this case) is calculated, therefore the normal pitch frequency can be finally calculated.

The internal processing in the acoustic analysis unit 52 is performed as described above, and the relative pitch difference is extracted as a feature amount for discrimination.

Also in the method of calculating the above relative pitch difference, there is a case in which an extraction error such as a double pitch or a half pitch sometimes occur as in the problem in the common pitch frequency extraction method.

Figure 13A:
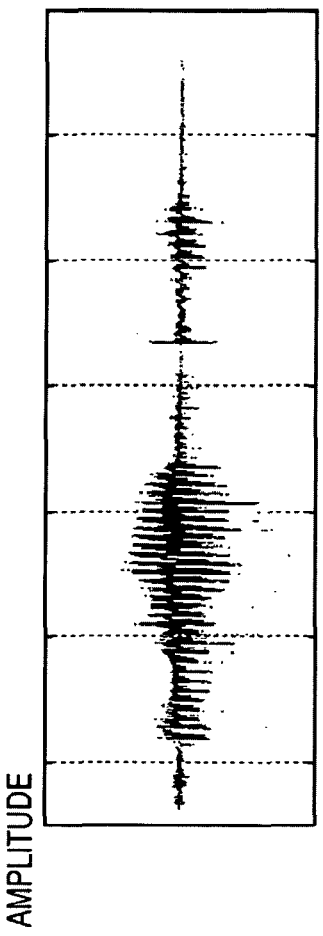
FIG. 13A and FIG. 13B are graphs explaining an example of an double-pitch extraction error occurring in calculation of relative pitch variation.
Figure 13B:
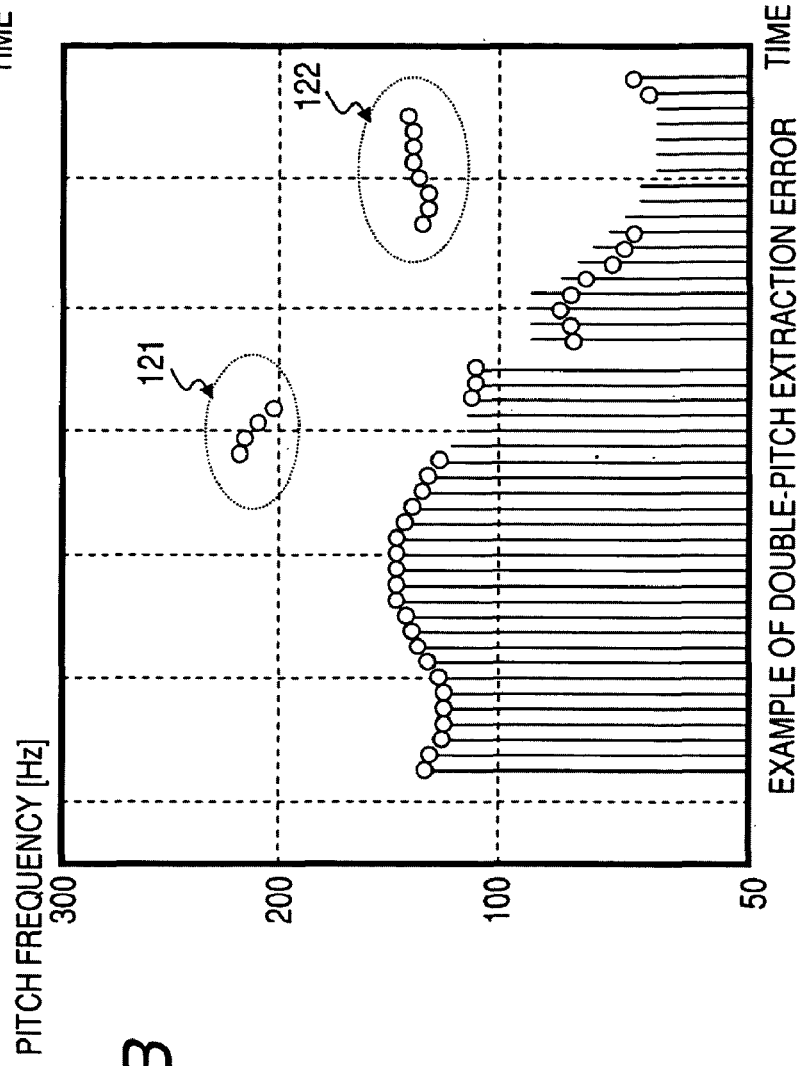

FIG. 13A and FIG. 13B show a generation example of a double-pitch extraction error in the method of acquiring the relative pitch difference as a feature amount. FIG. 13A shows a speech waveform corresponding to speech of a word and FIG. 13B shows a pitch pattern corresponding to the speech waveform shown in FIG. 13A. The horizontal axis in each graph is a time axis and a vertical axis in a graph of FIG. 13B is a pitch frequency [Hz].

Each mark "o" shown in the graph of FIG. 13B shows the pitch frequency measured at each analysis frame. Generally, the pitch frequency varies at each analysis frame smoothly. Therefore, separated data 121, 122 shown in FIG. 13B are presumably the data generated due to the double pitch extraction error.

Figure 14:
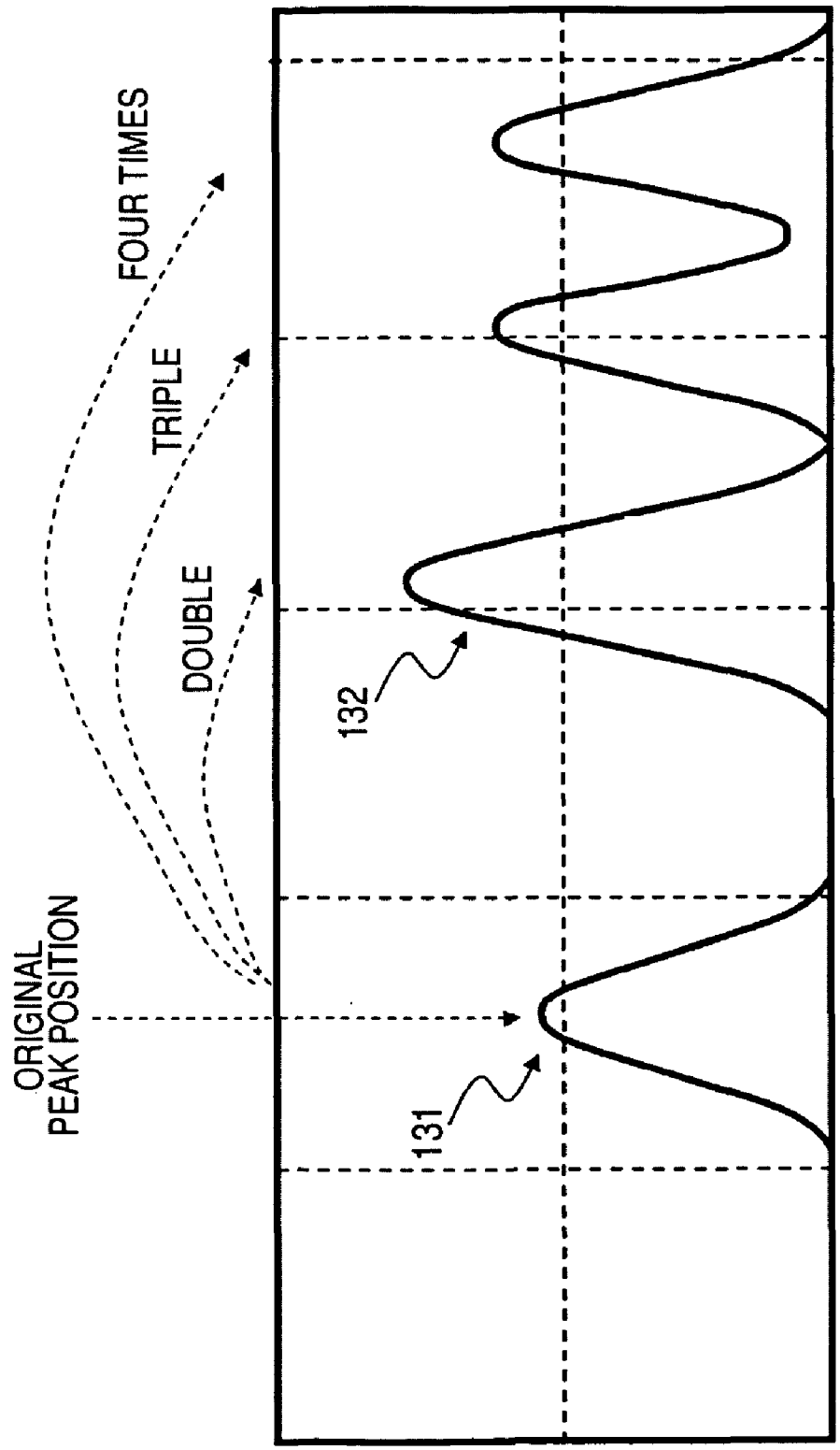
FIG. 14 is a drawing showing an example of a frequency characteristic of one analysis frame in which the double-pitch extraction error occurs.

FIG. 14 shows an example of a frequency characteristic of one analysis frame in apart where the double pitch extraction error occurs. As can be seen from FIG. 14, a harmonic structure corresponding to original pitch frequencies appears on the frequency characteristic, in which a peak component 132 corresponding to a frequency twice as large as the original pitch frequency is larger than a peak component 131 corresponding to the original pitch frequency. When the peak component 132 is acquired as the pitch frequency, the data 121, 122 shown in FIG. 13B occur and it is difficult to perform the correct analysis.

Figure 15:
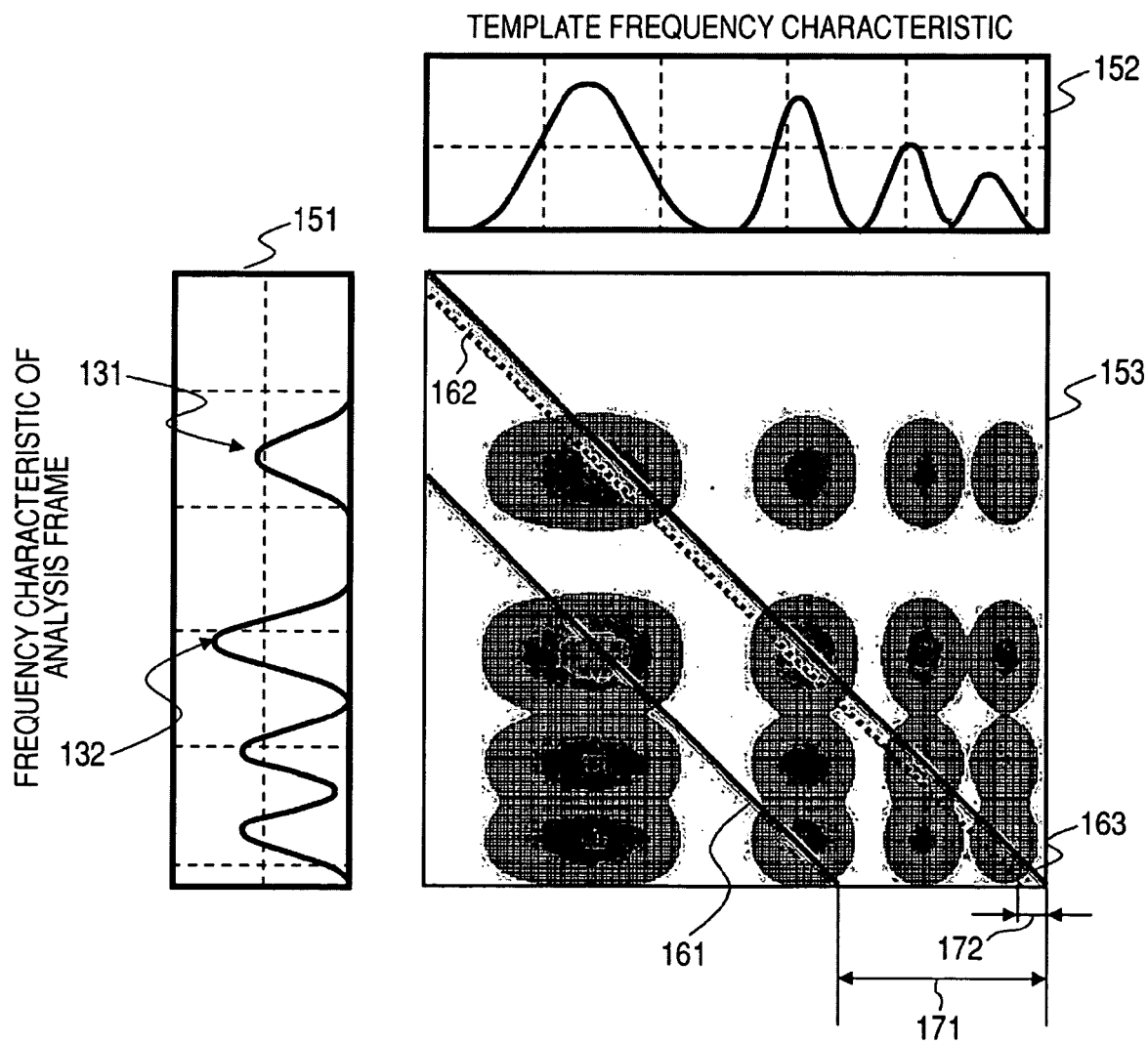
FIG. 15 is a drawing explaining an example of a cross-correlation matrix with respect to a template frequency characteristic in one analysis frame in which the double-pitch extraction error occurs.

FIG. 15 is a view showing a cross-correlation matrix between the frequency characteristic of the analysis frame shown in FIG. 14 and the template frequency characteristic (pitch frequency to be the reference in this case is 100 Hz). That is, a frequency characteristic 151 in the analysis frame in which the peak component 132 corresponding to the frequency twice as large as the original pitch frequency is larger than the peak component 131 corresponding to the original pitch frequency as shown in FIG. 14, a template frequency characteristic 152 and a cross-correlation matrix 153 obtained by these two frequency characteristics are shown.

In the cross-correlation matrix 153, an edge line 161 connecting corresponding respective peaks between the two frequency characteristics is shown. The edge line 161 shows a position corresponding to the frequency twice as large as the original pitch frequency, and the correct edge line should be a position of a second edge line 162 which is close to a diagonal 163 in FIG. 15.

When the relative pitch difference is calculated in the manner described above by applying the edge line 161 showing the position corresponding to the frequency twice as large as the original pitch frequency, a relative pitch difference 171 shown in the drawing can be calculated. However, the actual relative pitch difference which should be calculated from the original pitch frequency should be a relative pitch difference 172 as a shift amount between the edge line 162 and the diagonal 163 shown in the drawing.

In the case that a peak component of the n-times frequency is larger than the peak component of the original pitch frequency in the frequency characteristic of the analysis frame as described above, the relative pitch difference calculated from the cross-correlation matrix, that is, the determination of a shift amount between the edge line and the principal diagonal is sometimes improper.

The invention addresses the above problem, and in the embodiment of the invention, (a) a first relative pitch difference according to comparison between the frequency characteristic of the analysis frame and the template frequency characteristic (b) a second relative pitch difference according to comparison between frequency characteristics of portions temporally adjacent to each other.

Two relative pitch differences of the above (a) and (b) are calculated, and the peak component of the original pitch frequency is positively detected by using the two kinds of relative pitch differences to thereby obtain the correct relative pitch frequency.

Figure 16:
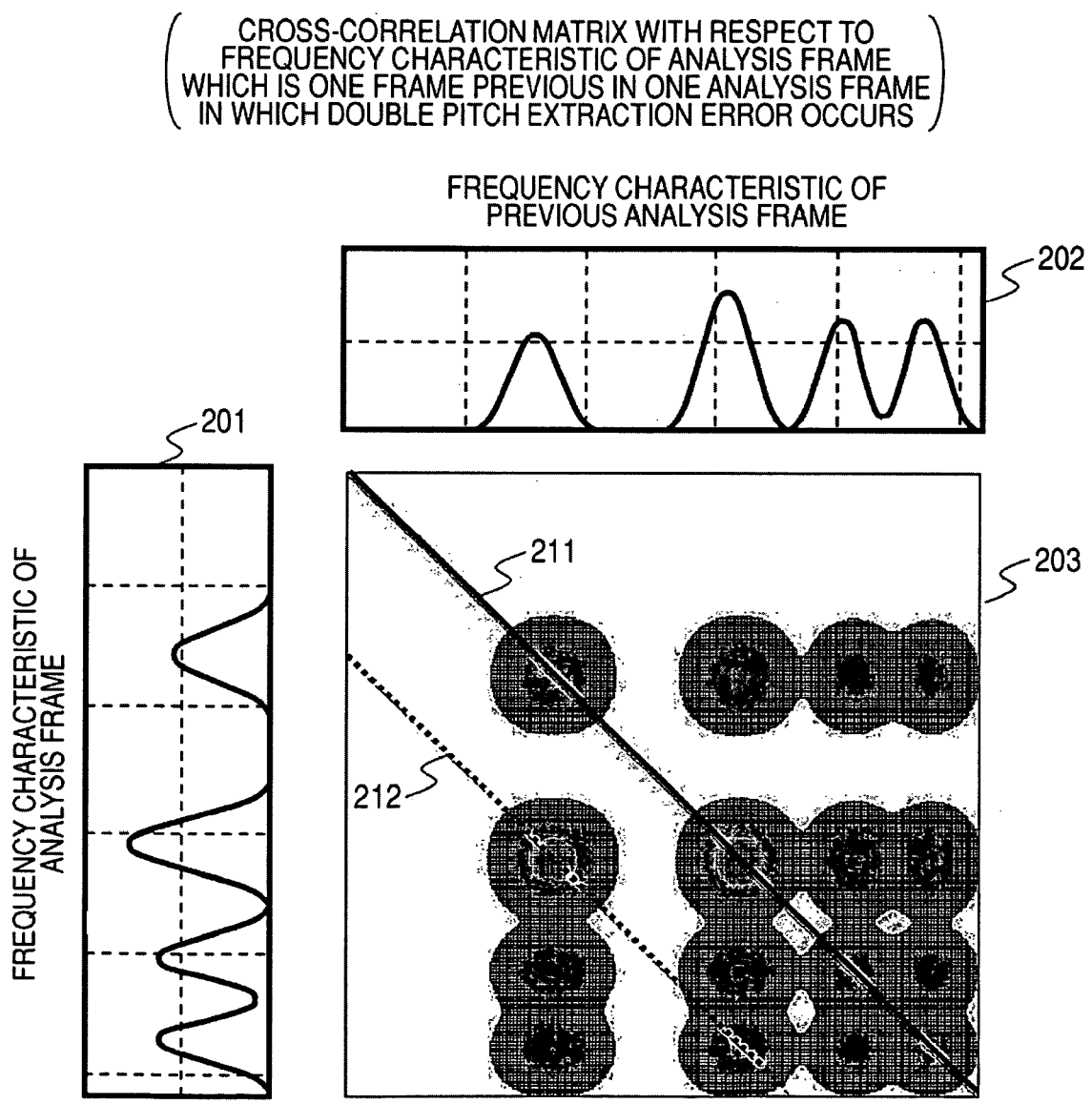
FIG. 16 is a drawing explaining an example of a cross-correlation matrix with respect to a frequency characteristic of an analysis frame which is one frame previous to the one analysis frame in which the double-pitch extraction error occurs.

FIG. 16 shows a frequency characteristic 201 of a certain analysis frame (same as the frequency characteristic 151), a frequency characteristic 202 of a previous analysis-frame with respect to the analysis frame, for example, the frequency characteristic 202 which is previous by one frame and a cross-correlation matrix 203 calculated from these two frequency characteristics.

In the cross-correlation matrix 203 shown in FIG. 16, an edge line formed by connecting points corresponding to peaks of respective frequency characteristics will be an edge line 211 shown in FIG. 16. A dashed line 212 shown in FIG. 16 is not selected as an edge line. It is possible to calculate the correct relative pitch difference when selecting the edge line 211 shown in FIG. 16 and calculating the shift amount with respect to the diagonal. As can be seen from that, the double pitch extraction error does not occur in the relative pitch difference by comparison between frequency characteristics in portions temporally adjacent to each other.

In the point of similarity of respective envelopes of two frequency characteristics when calculating the cross-correlation matrix, similarity between the frequency characteristic of the frame and the frequency characteristic of the adjacent frame is higher than similarity between the frequency characteristic of the frame and the template frequency characteristic.

Next, a processing sequence in the speech analysis apparatus according to the embodiment of the invention, that is, a sequence of double/half pitch correction processing will be explained with reference to a flowchart shown in FIG. 17. The flow shown in FIG. 17 corresponds to the processing of the acoustic analysis unit 52 in the prosodic discrimination unit 32 shown in FIG. 2, which is chiefly the processing in the relative pitch variation calculation unit 62.

In the storage unit (memory) of the speech analysis apparatus, template frequency characteristic data is stored. The relative pitch variation calculation unit 62 acquires template frequency characteristic data from the storage unit (memory) and further, sequentially inputting frequency characteristics in analysis frames generated in the frequency characteristic analysis unit 61 at previously set analysis intervals to execute processing following the flow shown in FIG. 17.

First, in Step S101, a first cross-correlation matrix is calculated from the frequency characteristic of the analysis frame newly inputted and the template frequency, and the shift amount between the edge line and the diagonal in the calculated cross-correlation matrix is calculated, allowing the amount to be a first relative pitch difference (hereinafter, referred to as a template relative pitch difference). For example, in the example shown in FIG. 15, the template relative pitch difference is calculated as a relative pitch difference 171.

Next, in Step S102, the difference between the template relative pitch difference of the current analysis frame calculated in Step S101 and the template relative pitch difference corresponding to the analysis frame which is previous by one frame.

Next, in Step S103, whether an absolute value of the difference between the two relative pitch differences calculated in Step S102 is equal to or less than a predetermined threshold or not is determined. When the value is equal to or less than the threshold, the process ends, and the template relative pitch difference calculated in Step S101 is determined as the relative pitch difference to be applied to the relative pitch variation calculation processing.

In Step S103, when it is determined that the absolute value of the difference between the two relative pitch differences calculated in Step S102 is not equal to or less than the predetermined threshold, the process proceeds to Step S104.

As a threshold to be applied in Step S103, for example, a value calculated by adding or subtracting a value of a certain margin with respect to a logarithmic value corresponding to one octave is applied. For example, the threshold value is calculated from the following formula (formula 4).

$$T = \log(2) - \delta \quad \text{(Formula 4)}$$

Note that T: threshold
δ: margin value.

In Step S104, a second relative pitch difference (hereinafter, referred to as an adjacent relative pitch difference) is calculated from a cross-correlation matrix between the frequency characteristic of the current analysis frame and the frequency characteristic of the analysis frame which is previous by one frame. The difference corresponds to, for example, the shift amount between the edge line 212 and the diagonal (corresponds to the edge line 211 in FIG. 16) detected in the cross-correlation matrix 203 in FIG. 16.

Next, in step S105, whether the adjacent relative pitch difference calculated in Step S104 is equal to or less than a margin value (δ) shown in the above formula 4 or not is determined. When the difference is equal to or less than the margin value, the process proceeds to Step S106.

When the adjacent relative pitch difference calculated in Step S104 is not equal to or less than the margin value (δ) shown in the formula 4, the process ends, and the template relative pitch difference calculated in Step S101 is determined as the relative pitch difference to be applied to the relative pitch variation calculation processing.

On the other hand, in Step S105, when it is determined that the adjacent relative pitch difference calculated in Step S104 is equal to or less than a margin value (δ) shown in the formula 4, the process proceed to Step S106. In this case, it is determined that the template relative pitch difference calculated in Step S101 is the relative pitch difference close to the double pitch or a half pitch, which is an error, and the template relative pitch difference is calculated, which is corrected by adding or subtracting a logarithmic value corresponding to one octave to and from the template relative pitch difference calculated in Step S101 (subtracting one-octave value at the time of the double pitch and adding one-octave value at the time of half pitch), then, the corrected template relative pitch difference is determined as the relative pitch difference to be applied to the relative pitch variation calculation processing.

The correction processing for double/half pitch is performed in the relative pitch variation calculation unit 62 in the prosodic discrimination unit 32 shown in FIG. 2 according to the above flow, determining the relative pitch difference corresponding to each analysis frame, namely, the relative pitch difference to be applied to the relative pitch variation calculation processing.

As described above, in the acoustic analysis unit 52 of the prosodic discrimination unit 32 included in the speech analysis apparatus 11 according to an embodiment of the invention, the current template relative pitch difference which is the relative pitch difference between the frequency characteristic of the current analysis frame and the previously-set template frequency characteristic is calculated, and further, whether the difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not. When the absolute value is not equal to or less than the threshold, the adjacent relative pitch difference which is the relative pitch difference between the frequency characteristic of the current analysis frame and the frequency characteristic of the previous frame is calculated, and when the adjacent relative pitch difference is equal to or less than a previously set margin value, correction processing of adding or subtracting an octave of current template relative pitch difference is performed to determine the value as the relative pitch difference of the current analysis frame, then, the relative pitch variation is calculated by applying the determined relative pitch difference.

When the difference absolute value between the previous template relative pitch difference and the current template relative pitch difference is equal to or less than the predetermined threshold, or when the difference absolute value between the previous template relative pitch difference and the current template relative pitch difference is not equal to or less than the predetermined threshold as well as the adjacent relative pitch difference is not equal to or less than the previously set margin value, the current template relative pitch difference is determined as the relative pitch difference of the current analysis frame.

Figure 17:
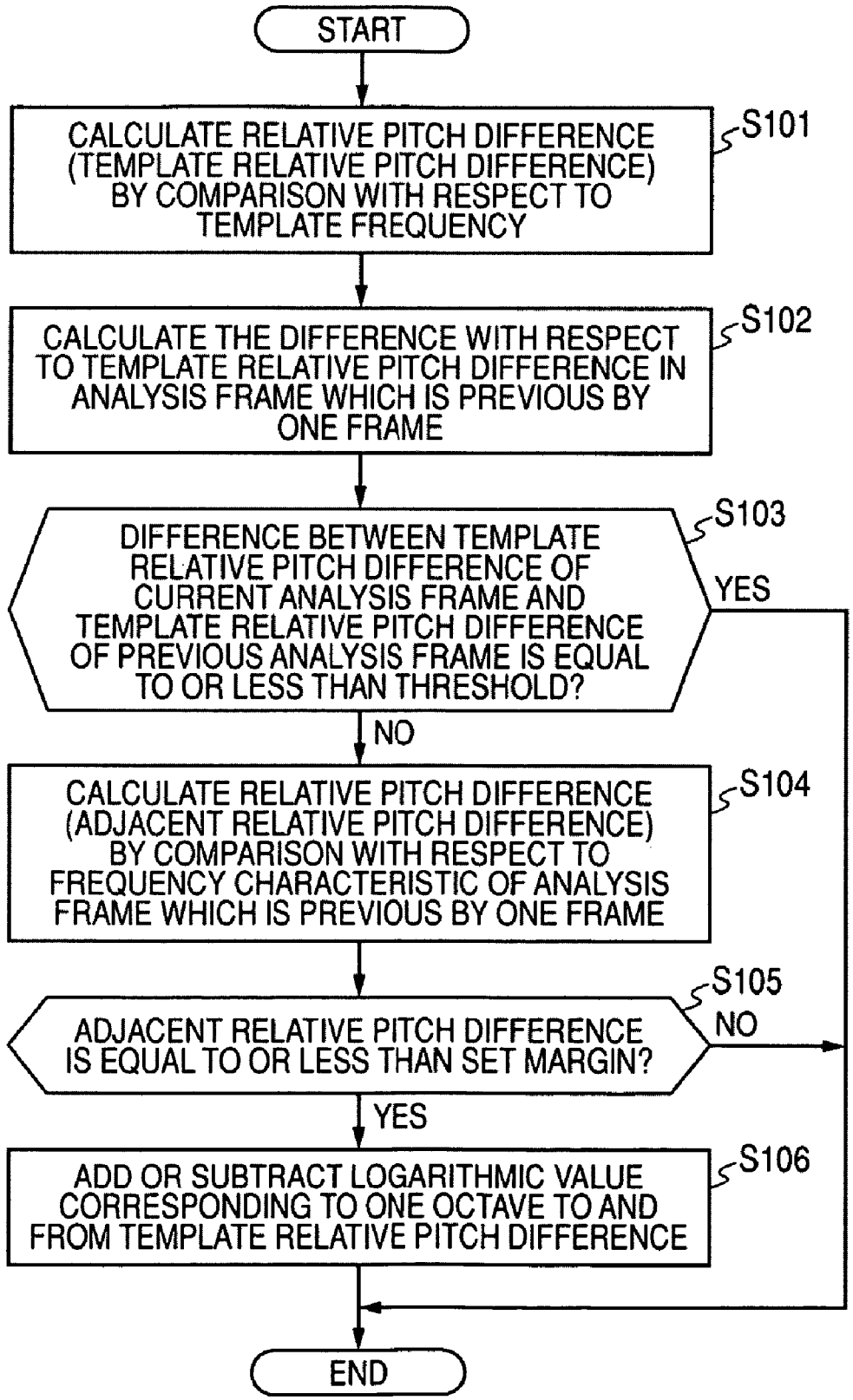
FIG. 17 is a flowchart explaining a processing sequence of the relative pitch variation calculation unit in the speech analysis apparatus according to an embodiment of the invention.

According to the relative pitch differences in respective analysis frames determined by the processing following the flow shown in FIG. 17, relative pitch variation data shown, for example, in FIG. 18B is generated. FIG. 18A and FIG. 18B show relative pitch variation data (FIG. 18B, pitch pattern) generated by applying the processing following the flow shown in FIG. 17 with respect to speech data (FIG. 18A, speech waveform) which is the same as the one previously explained with reference to FIGS. 13A and 13B.

In the pitch pattern shown in FIG. 18B, the separated data 121, 122 shown in FIG. 13B which was previously explained do not appear and the double-pitch extraction error is cancelled by adding the correction processing following the flow shown in FIG. 17.

Accordingly, the speech analysis apparatus according to the embodiment of the invention is the prosodic discrimination apparatus performing discrimination based on prosodic characteristics of input speech. In the prosodic discrimination apparatus performing discrimination by using relative pitch variation between two frequency characteristics, the relative pitch difference is extracted by comparison with respect to the template frequency characteristic as well as the relative pitch difference is also extracted by comparison with respect to the adjacent frame to thereby cancel the double pitch or the half pitch extraction error by considering continuity of the relative pitches between adjacent frames, as a result, speech recognition by the prosodic discrimination which is accurate and stable can be realized.

The processing explained with reference to FIG. 3A to FIG. 18B is the processing in the prosodic discrimination unit 32 shown in FIG. 2, and speech recognition only by the processing in the prosodic discrimination unit 32 may be performed, however, it is also preferable that the processing in the existing speech recognition unit 33 is executed in parallel, following the configuration shown in FIG. 1 as previously explained, and the final recognition result is outputted by selectively applying the recognition result obtained by the processing in the prosodic discrimination unit 32 and the recognition result obtained by the processing in the existing speech recognition unit 33. The processing sequence when performing such processing will be explained with reference to a flowchart shown in FIG. 19.

Figure 19:
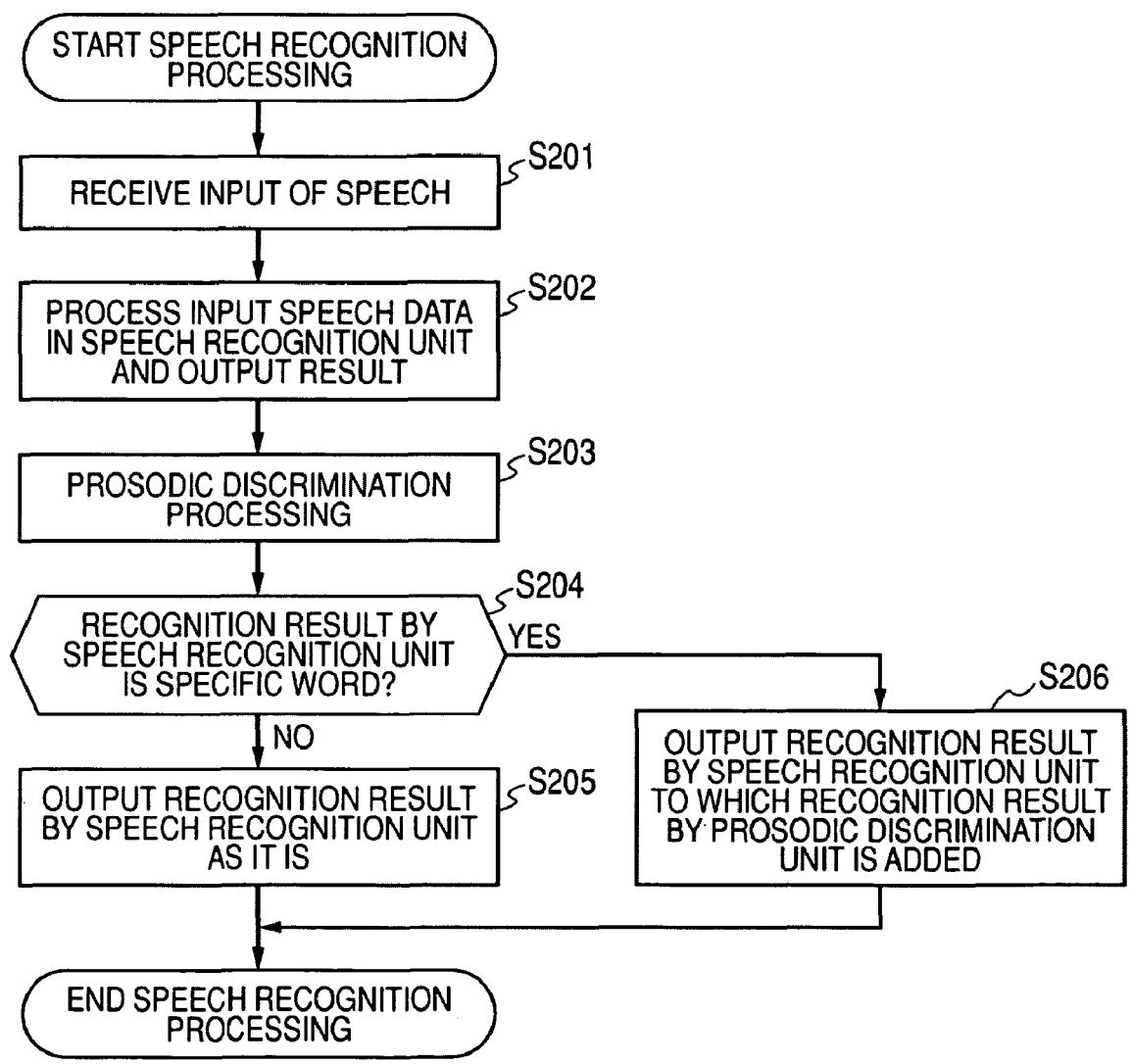
FIG. 19 is a flowchart explaining a processing sequence of the speech analysis apparatus according to an embodiment of the invention.

The flowchart of FIG. 19 is a flow for explaining a sequence of speech recognition processing executed in the speech analysis apparatus 11 shown in FIG. 1. The processing of respective steps of the flow of FIG. 19 will be explained with reference to the configuration diagram of the speech analysis apparatus 11 shown in FIG. 1.

First, in Step S201, the input unit 31 receives input of a speech signal and supplies it to the prosodic discrimination unit 32 and the speech recognition unit 33. Next, in Step S202, the speech recognition unit 33 recognizes the supplied speech signal, acquiring text data to be supplied to the result selection unit 34.

In Step S203, the prosodic discrimination unit 32 performs prosodic discrimination processing explained with reference to FIG. 2 to FIG. 18B. In Step S204, the result selection unit 34 receives the supply of the recognition results from the prosodic discrimination unit 32 and the speech recognition unit 33, determining whether the recognition result from the speech recognition unit 33 corresponds to a specific word stored in the specific word storage unit 35 or not.

In Step S204, when the result does not correspond to any specific word, the result selection unit 34 outputs the recognition result by the speech recognition unit 33 to the output unit 36 as it is in Step S205 to end the processing.

In Step S204, the result corresponds to a specific word, the result selection unit 34 outputs the recognition result from the speech recognition unit 33 to which the recognition result from the prosodic discrimination unit 32 is added to the output unit 36 in Step S206 to end the processing.

In addition, for example, the prosodic discrimination unit 32 analyzes the supplied speech and discriminates the type of the speech as any of four speech types including "affirmative", "negative", "question", and "others" meaning that the speech belongs to the type other than the above three speech types, and the result selection unit 34 outputs only the speech recognition result from the speech recognition unit 33 when "others" is given as the prosodic discrimination result and outputs the prosodic discrimination result from the prosodic discrimination unit 32 to which the speech recognition result from the speech recognition unit 33 is added when the prosodic discrimination result is any of "affirmative", "negative" and "question". In Step 204, the result selection unit 34 receives the supply of the recognition result from the prosodic discrimination unit 32 and the speech recognition unit 33, determining whether the prosodic discrimination result belongs to "others" or not instead of determining whether the recognition result from the speech recognition unit 33 corresponds to a specific word or not. In the case of "others", the processing of S205 is performed and in the case of the type other than "others", the processing of Step S206 is executed.

Accordingly, the invention has been described in detail with reference to the specific embodiment. However, it should be understood by those skilled in the art that various modifications and alterations may occur insofar as they are within the scope of the gist of the invention. That is to say, the invention has been disclosed in a form of exemplification and it should not be taken in a limited manner. In order to determine the gist of the invention, the section of claims should be taken into consideration.

It is possible to execute a series of processing explained in the specification by hardware or software, or by a combined configuration of both. When executing processing by software, a program in which the processing sequence is recorded can be executed by installing the program in a memory in a computer incorporated in dedicated hardware, or executed by installing the program in a general-purpose computer which can execute various processing. For example, the program can be previously recorded in a recording medium. In addition to installation from the recording medium to the computer, it is possible to receive the program through networks such as LAN (Local Area Network) or Internet and to install the program in a recording media such as an internal hard disc.

Various processing described in the specification may not only be performed in accordance with the description in time series but also be performed in parallel or individually according to processing ability of the apparatus executing the processing or according to need. The system in the specification indicates a logical aggregate of plural apparatuses, and apparatuses of respective configurations are not always in the same casing.

As described above, according to the configuration of one embodiment of the invention, in the prosodic discrimination processing performing discrimination based on prosodic characteristics of input speech, a first relative pitch difference is extracted by comparing a frequency characteristic corresponding to an analysis frame generated from the input speech to a template frequency characteristic as well as a second relative pitch difference is calculated by comparing the frequency characteristic of the analysis frame and a frequency characteristic of a previous frame, and correction processing of the relative pitch difference is executed in consideration of the continuity of relative pitches between adjacent frames based on these two relative pitch differences. According to the configuration, the double-pitch or half-pitch extraction error can be cancelled and highly accurate and robust prosodic discrimination can be realized.

What is claimed is:

1. A speech analysis apparatus analyzing prosodic characteristics of speech information and outputting a prosodic discrimination result, comprising:

an input unit performing input of speech information;

an acoustic analysis unit analyzing frequency characteristics of respective analysis frames set in time series with respect to speech information inputted from the input unit and calculating relative pitch variation as variation information of frequency characteristics of respective analysis frames; and a discrimination unit performing speech discrimination processing based on the relative pitch variation generated by the acoustic analysis unit, and wherein the acoustic analysis unit calculates a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the difference absolute value is not equal to or less than the predetermined threshold, calculating an adjacent relative pitch difference which is a relative pitch difference between the frequency characteristic of the current analysis frame and the frequency characteristic of the previous frame, and when the adjacent relative pitch difference is equal to or less than a previously set margin value, executing correction processing of adding or subtracting an octave of the current template relative pitch difference to calculate the relative pitch variation by applying the template relative pitch difference as the relative pitch difference of the current analysis frame;

wherein the acoustic analysis unit calculates the relative pitch variation by applying the current template relative pitch difference as the relative pitch difference of the current analysis frame when the difference absolute value between the previous template relative pitch difference and the current template relative pitch difference is equal to or less than the predetermined threshold;

wherein the acoustic analysis unit calculates the relative pitch variation by applying the current template relative pitch difference as the relative pitch difference of the current analysis frame when the difference absolute value between the previous template relative pitch difference and the current template relative pitch difference is not equal or less than the predetermined threshold as well as the adjacent relative pitch difference is not equal or less than the previously set margin value;

wherein the previously set template frequency characteristic is a data creating a frequency characteristic in simulation, in which amplitude of harmonic components are linearly attenuated with respect to a fundamental pitch derived from stored speech signal;

wherein the acoustic analysis unit calculates a cross-correlation matrix defining the relation between two frequency characteristics for calculating the template relative pitch difference, calculating a value corresponding to a shift amount of an edge line connecting peak positions of values of configuration data of the cross-correlation matrix from the principal diagonal of the cross-correlation matrix as the template relative pitch difference;

wherein the acoustic analysis unit calculates a cross-correlation matrix defining the relation between two frequency characteristics for calculating the adjacent relative pitch difference, calculating a value corresponding to a shift amount of an edge line connecting peak positions of values of configuration data of the cross-correlation matrix from the principal diagonal of the cross-correlation matrix as the adjacent relative pitch difference; and wherein the acoustic analysis unit generates frequency characteristic information in which the frequency characteristic information is expressed on a logarithmic frequency axis, and when the predetermined threshold is T and the previously set margin value is $\delta$, the predetermined threshold T and the previously set margin value are related according to the following formula $T = \log(2) - \delta$.

2. The speech analysis apparatus according to claim 1, wherein the discrimination unit performs speech discrimination processing by comparing parameters corresponding to a prosodic discrimination unit dictionary previously stored in a storage unit to relative pitch variation data generated by the acoustic analysis unit.

3. The speech analysis apparatus according to claim 2, wherein the discrimination unit performs speech discrimination processing according to processing applying any of a DP (Dynamic Programming) matching, a neural network, a HMM (Hidden Markov Model).

4. The speech analysis apparatus according to claim 1, further comprising:
a speech recognition unit outputting text information corresponding to input speech data from the input unit as a speech recognition result; and
a result selection unit outputting the speech recognition result by applying a discrimination result of the discrimination unit and a discrimination result of the speech recognition unit.

5. The speech analysis apparatus according to claim 4, wherein the result selection unit outputs the speech recognition result to which a prosodic discrimination result discriminated in the discrimination unit is added when the speech recognition result corresponds to a specific word as a result of comparison between the speech recognition result in the speech recognition unit and specific words stored in the specific word storage unit, and outputs the speech recognition result as it is when the speech recognition result does not correspond to a specific word.

6. A speech analysis method analyzing prosodic characteristics of speech information and outputting a prosodic discrimination result, comprising the steps of:
performing input of speech information by an input unit;
analyzing frequency characteristics of respective analysis frames set in time series with respect to speech information inputted from the input unit and calculating relative pitch variation as variation information of frequency characteristics of respective analysis frames by an acoustic analysis unit; and
performing speech discrimination processing by a discrimination unit based on the relative pitch variation generated by the acoustic analysis unit, and
wherein the acoustic analysis unit has the steps of calculating a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the difference absolute value is not equal to or less than the predetermined threshold, calculating an adjacent relative pitch difference which is a relative pitch difference between the frequency characteristic of the current analysis frame and the frequency characteristic of the previous frame, and when the adjacent relative pitch difference is equal to or less than a previously set margin value, executing correction processing of adding or subtracting an octave of the current template relative pitch difference to calculate the relative pitch variation by applying the template relative pitch difference as the relative pitch difference of the current analysis frame;
wherein the step performed by the acoustic analysis unit is the step of calculating the relative pitch variation by applying the current template relative pitch difference as the relative pitch difference of the current analysis frame when the difference absolute value between the previous template relative pitch difference and the current template relative pitch difference is equal to or less than the predetermined threshold;
wherein the step performed by the acoustic analysis unit is the step of calculating the relative pitch variation by applying the current template relative pitch difference as the relative pitch difference of the current analysis frame when the difference absolute value between the previous template relative pitch difference and the current template relative pitch difference is not equal or less than the predetermined threshold as well as the adjacent relative pitch difference is not equal or less than the previously set margin value;

wherein the previously set template frequency characteristic is a data creating a frequency characteristic in simulation, in which amplitude of harmonic components are linearly attenuated with respect to a fundamental pitch derived from stored speech signal;

wherein the step performed by the acoustic analysis unit has the steps of calculating a cross-correlation matrix defining the relation between two frequency characteristics for calculating the template relative pitch difference and calculating a value corresponding to a shift amount of an edge line connecting peak positions of values of configuration data of the cross-correlation matrix from the principal diagonal of the cross-correlation matrix as the template relative pitch difference;

wherein the step performed by the acoustic analysis unit has the steps of calculating a cross-correlation matrix defining the relation between two frequency characteristics for calculating the adjacent relative pitch difference and calculating a value corresponding to a shift amount of an edge line connecting peak positions of values of configuration data of the cross-correlation matrix from the principal diagonal of the cross-correlation matrix as the adjacent relative pitch difference; and wherein the steps performed by the acoustic analysis unit has the steps of generating frequency characteristic information in which the frequency characteristic information is expressed on a logarithmic frequency axis, and when the predetermined threshold is T and the previously set margin value is δ, the predetermined threshold T and the previously set margin value δ are related according to the following formula $T=\log(2)-\delta.$

7. The speech analysis method according to claim 6, wherein the step performed by the discrimination unit is the step of performing speech discrimination processing by comparing parameters corresponding to a prosodic discrimination unit dictionary previously stored in a storage unit to relative pitch variation data generated by the acoustic analysis unit.

8. The speech analysis method according to claim 7, wherein the step performed by the discrimination unit is the step of performing speech discrimination processing according to processing applying any of a DP (Dynamic Programming) matching, a neural network, a HMM (Hidden Markov Model).

9. The speech analysis method according to claim 6, further comprising the steps of:

outputting text information corresponding to input speech data from the input unit as a speech recognition result by a speech recognition unit; and outputting the speech recognition result by applying a discrimination result of the discrimination unit and a discrimination result of the speech recognition unit by the result selection unit.

10. The speech analysis method according to claim 9, wherein the step performed by the result selection unit is the step of outputting the speech recognition result to which a prosodic discrimination result discriminated in the discrimination unit is added when the speech recognition result corresponds to a specific word as a result of comparison between the speech recognition result in the speech recognition unit and specific words stored in the specific word storage unit, or outputting the speech recognition result as it is when the speech recognition result does not correspond to a specific word.

11. A non-transitory computer readable storage device storing a computer program, which when executed by a speech analysis apparatus performs a method for analyzing prosodic characteristics of speech information and outputting a prosodic discrimination result, comprising the steps of:

receiving input of speech information by an input unit;

analyzing, with an acoustic analysis unit, frequency characteristics of respective analysis frames set in time series with respect to speech information inputted from the input unit and calculating relative pitch variation as variation information of frequency characteristics of respective analysis frames; and performing, by a discrimination unit, speech discrimination processing based on the relative pitch variation generated by the acoustic analysis unit, and wherein the step performed by the acoustic analysis unit has the steps of calculating a current template relative pitch difference which is a relative pitch difference between a frequency characteristic of a current analysis frame and a previously set template frequency characteristic, determining whether a difference absolute value between the current template relative pitch difference and a previous template relative pitch difference which is a relative pitch difference between a frequency characteristic of a previous frame which is temporally previous to the current analysis frame and the template frequency characteristic is equal to or less than a predetermined threshold or not, when the difference absolute value is not equal to or less than the predetermined threshold, calculating an adjacent relative pitch difference which is a relative pitch difference between the frequency characteristic of the current analysis frame and the frequency characteristic of the previous frame, and when the adjacent relative pitch difference is equal to or less than a previously set margin value, executing correction processing of adding or subtracting an octave of the current template relative pitch difference to calculate the relative pitch variation by applying the template relative pitch difference as the relative pitch difference of the current analysis frame;

wherein the acoustic analysis unit calculates the relative pitch variation by applying the current template relative pitch difference as the relative pitch difference of the current analysis frame when the difference absolute value between the previous template relative pitch difference and the current template relative pitch difference is equal to or less than the predetermined threshold;

wherein the acoustic analysis unit calculates the relative pitch variation by applying the current template relative pitch difference as the relative pitch difference of the current analysis frame when the difference absolute value between the previous template relative pitch difference and the current template relative pitch difference is not equal or less than the predetermined threshold as well as the adjacent relative pitch difference is not equal or less than the previously set margin value;

wherein the previously set template frequency characteristic is a data creating a frequency characteristic in simulation, in which amplitude of harmonic components are linearly attenuated with respect to a fundamental pitch derived from stored speech signal;

wherein the steps performed by the acoustic analysis unit has the steps of calculating a cross-correlation matrix defining the relation between two frequency characteristics for calculating the template relative pitch difference and calculating a value corresponding to a shift amount of an edge line connecting peak positions of values of configuration data of the cross-correlation matrix from the principal diagonal of the cross-correlation matrix as the template relative pitch difference;

wherein the steps performed by the acoustic analysis unit has the steps of calculating a cross-correlation matrix defining the relation between two frequency characteristics for calculating the adjacent relative pitch difference, calculating a value corresponding to a shift amount of an edge line connecting peak positions of values of configuration data of the cross-correlation matrix from the principal diagonal of the cross-correlation matrix as the adjacent relative pitch difference; and wherein the steps performed by the acoustic analysis unit has the steps of generating frequency characteristic information in which the frequency characteristic information is expressed on a logarithmic frequency axis, and when the predetermined threshold is T and the previously set margin value is δ the predetermined threshold T and the previously set margin value δ are related according to the following formula $T=\log(2)-\delta.$

* * * * *